United States Patent
Hattori

(10) Patent No.: US 8,446,390 B2
(45) Date of Patent: May 21, 2013

(54) ELECTRO-OPTICAL DEVICE AND ELECTRONIC APPARATUS

(75) Inventor: Yasunori Hattori, Suwa (JP)

(73) Assignee: Sony Corporation, Tokyo (JP)

( * ) Notice: Subject to any disclaimer, the term of this patent is extended or adjusted under 35 U.S.C. 154(b) by 636 days.

(21) Appl. No.: 12/423,395

(22) Filed: Apr. 14, 2009

(65) Prior Publication Data

US 2009/0289910 A1  Nov. 26, 2009

(30) Foreign Application Priority Data

May 22, 2008  (JP) ................................. 2008-134374

(51) Int. Cl.
*G06F 3/042* (2006.01)

(52) U.S. Cl.
USPC ...... 345/175; 345/173; 178/18.09; 178/18.11

(58) Field of Classification Search
USPC ............... 345/102, 173, 175, 176; 178/18.09, 178/18.11, 18.03; 257/431–466, 290–294
See application file for complete search history.

(56) References Cited

U.S. PATENT DOCUMENTS

| | | | | |
|---|---|---|---|---|
| 4,626,675 A | * | 12/1986 | Gundner et al. | 257/440 |
| 5,149,956 A | * | 9/1992 | Norton | 257/188 |
| 5,373,182 A | * | 12/1994 | Norton | 257/440 |
| 5,453,611 A | * | 9/1995 | Oozu et al. | 250/208.1 |
| 5,666,574 A | * | 9/1997 | Ogawa | 396/233 |
| 5,767,538 A | * | 6/1998 | Mullins et al. | 257/115 |
| 7,006,171 B1 | * | 2/2006 | Koden et al. | 349/61 |
| 7,158,129 B2 | * | 1/2007 | Nakajima | 345/207 |
| 7,883,916 B2 | * | 2/2011 | Gambino et al. | 438/48 |
| 8,004,484 B2 | * | 8/2011 | Tateuchi et al. | 345/92 |
| 8,089,476 B2 | * | 1/2012 | Ishiguro et al. | 345/175 |
| 8,212,793 B2 | * | 7/2012 | Ishiguro | 345/175 |
| 2003/0218175 A1 | * | 11/2003 | Ogawa et al. | 257/80 |
| 2006/0244693 A1 | * | 11/2006 | Yamaguchi et al. | 345/76 |
| 2006/0266928 A1 | * | 11/2006 | Takiba et al. | 250/214.1 |
| 2007/0018915 A1 | * | 1/2007 | Tang et al. | 345/76 |
| 2007/0284532 A1 | * | 12/2007 | Nakanishi et al. | 250/339.02 |
| 2009/0096768 A1 | * | 4/2009 | Ohira et al. | 345/175 |
| 2009/0141004 A1 | * | 6/2009 | Yamazaki | 345/175 |

FOREIGN PATENT DOCUMENTS

| | | |
|---|---|---|
| JP | 2005-275644 | 10/2005 |
| JP | A-2006-301864 | 11/2006 |
| JP | A-2008-241807 | 10/2008 |
| JP | 2009-244638 | 10/2009 |

OTHER PUBLICATIONS

Nakamura, H. et al.; "Touch Panel Function Integrated LCD Using LTPS Technology," IDW/AD '05, pp. 1003-1006.
Office Action issued Sep. 11, 2012 in corresponding Japanese Appln. No. 2008-134374.

* cited by examiner

*Primary Examiner* — Dmitriy Bolotin
(74) *Attorney, Agent, or Firm* — K&L Gates LLP

(57) ABSTRACT

An electro-optical device includes a plurality of pixel portions formed in a display region on a substrate, a first light-receiving element which is formed in the display region and shows light-receiving sensitivity with respect to an incident visible ray which enters a display surface, a second light-receiving element which is formed in the display region and shows light-receiving sensitivity with respect to an incident infrared ray which enters the display surface, and a detecting unit which detects a pointing unit which points the display surface on the basis of the light-receiving sensitivity with respect to the incident visible ray and the light-receiving sensitivity with respect to the incident infrared ray.

15 Claims, 15 Drawing Sheets

FIG. 14

ELECTRO-OPTICAL DEVICE AND ELECTRONIC APPARATUS

BACKGROUND

1. Technical Field

The present invention relates to a technique of an electro-optical device, such as a liquid crystal device having a touch panel function which allows a user to input various information via a display surface in a manner such that the user points the display surface with a pointing unit, such as a finger, and an electronic apparatus, such as a direct-view display provided with the electro-optical device.

2. Related Art

As for the liquid crystal device which is an example of this kind of the electro-optical device, suggested is a liquid crystal device with a so-called touch panel function, in which optical sensors are arranged for a plurality of pixel portions, respectively, or a plurality of pixel groups, respectively, each pixel group including a certain number of pixel portions, and an image display by transmitted light which passed through the pixel portions and information input to the liquid crystal device via the pointing unit, such as finger, can be realized. In such a liquid crystal device, information input to the liquid crystal device can be realized in a manner such that the pointing unit, such as finger or pointing member, contacts the display surface or moves along the display surface and such contact or movement is detected by an optical sensor.

In the liquid crystal device having a touch panel function, for example, an optical sensor arranged at a region which overlaps the pointing unit, such as finger, of display regions at which an image is displayed, i.e. an optical sensor arranged at an region which overlaps a shadow of the pointing unit detects a light amount of an incident ray, which corresponds to the shadow of the pointing unit. The optical sensor arranged at the region which does not overlap the pointing unit detects a light amount of daylight ray which are not blocked by the pointing unit as the light amount of the incident ray, and acquires an image in which gradation levels are different at portions of the image according to a difference of light amounts. Accordingly, this kind of liquid crystal device detects the light amount of the incident light which is incident from the display surface which displays an image thereon, and can detect a position of the pointing unit on the basis of the image composed of portions of the image with gradation levels specified according to the light amounts of the incident light detected by the optical sensors, respectively. A non-patent document, Touch Panel Function Integrated LCD Using LTPS Technology, N. Nakamura et al, IDW/AD '05 p. 1003-1006, discloses a technique of detecting a position and a waveform of the pointing unit in a manner such that when an intensity of a daylight ray (visible ray) incident onto the display region is strong, a shadow of the pointing unit, such as filter, is detected, but when the intensity of the daylight ray (visible ray) is weak, a reflected ray which is reflected from the pointing unit such as a finger, of rays radiated from the display surface, is detected.

JP-A-2006-301864 discloses a technique of detecting a position of the pointing unit by detecting an infrared ray reflected from the pointing unit in the case in which it is difficult to detect a pointing unit due to relative magnitude relation between an intensity of a daylight ray and an intensity of a display ray radiated from the display surface, when detecting the pointing unit, such as finger.

However, according to technique disclosed in the non-patent document, there is a possibility that, of the display rays, the intensity of the reflected ray reflected from the pointing unit is almost equal to the intensity of the daylight ray under the condition in which the intensity of the display ray radiated from the display surface is almost equal to the intensity of the daylight ray. In such a case, it becomes difficult to differentiate the region overlapping the pointing unit of the display region from the other region on the basis of the difference between the intensities of the reflected ray and the daylight ray, and thus there is a technical problem in which it is difficult to detect the position of the pointing unit.

According to the technique disclosed in JP-A-2006-301864, even though the infrared ray is used to detect the pointing unit, under the condition in which intensities of the reflected infrared ray reflected from the pointing unit, such as a finger, and the infrared ray included in the daylight ray are almost equal to each other, the same problem as in the technique disclosed in the non-patent document occurs.

That is, in the case of detecting the pointing unit, such as a finger, by detecting light having a specific wavelength, there is a possibility that it is difficult to acquire correct information which specifies the position and form of the pointing unit and improve detection sensitivity of detecting the pointing unit according to environment in which the electro-optical device is used.

SUMMARY

It is an advantage of some aspects of the invention that it provides an electro-optical device having a touch panel function with an improved detection sensitivity for a pointing unit regardless of an intensity of a daylight ray in environment in which the electro-optical device is used, and an electronic apparatus, such as a direct-view display, including the electro-optical device.

According to one aspect of the invention, there is provided an electro-optical device including a plurality of pixel portions which is formed in a display region on a substrate, a first light-receiving element formed in the display region and shows light-receiving sensitivity with respect to an incident visible ray which enters a display surface, a second light-receiving element which is formed in the display region and shows light-receiving sensitivity with respect to an incident infrared ray which enters the display surface, and a detecting unit detecting a pointing unit which points the display surface on the basis of the light-receiving sensitivity with respect to the incident visible ray and the light-receiving sensitivity with respect to the incident infrared ray.

In the electro-optical device, it is preferable that the plurality of pixel portions be arranged, for example, in a matrix form in the display region on the surface. Luminance of the plurality of pixel portions, while the electro-optical device operates, is set, for example, according to an image signal supplied to each of the pixel portions. With such an operation, it is possible to display an image according to the image signal in the display region of the display surface.

The first light-receiving element is formed in the display region and shows the light-receiving sensitivity with respect to the incident visible ray which enter the display surface of the electro-optical device. The first light-receiving element shows the sensitivity with respect to the incident visible ray which enter the display surface while the electro-optical device operates. Here, the incident visible ray contains a visible ray component, which is blocked by the pointing unit, of the daylight ray or both of the blocked visible ray component and a visible ray component reflected form the pointing unit. The first light-receiving element is structured in a manner of being capable of outputting optical current according to, for example, optical intensity of the incident visible ray.

The second light-receiving element is formed in the display region and shows the light-receiving sensitivity with respect to the incident infrared ray which enter the display surface. The second light-receiving element shows the sensitivity with respect to the incident infrared ray which enters the display surface while the electro-optical device operates. Here, the incident infrared ray contains an infrared ray component, blocked by the pointing unit, of the daylight ray or both of the blocked infrared ray component and an infrared ray component reflected from the pointing unit. The second light-receiving element is structured in a manner of being capable of outputting optical current, i.e. output current, according to optical intensity of the incident infrared ray.

The first and second light-receiving elements are different in various element designs, such as element structure, size, or composition material so that their wavelength bands showing light-receiving sensitivity are different from each other.

The detecting unit detects the pointing unit, such as a finger which points the display surface on the basis of the light-receiving sensitivity of the incident visible ray and the light-receiving sensitivity with respect to the incident infrared ray. In more detail, for example, the detecting unit is electrically connected to each of the first and second light-receiving elements, and is a circuit portion structured in a manner of being capable of acquiring various information, such as position and form, of the pointing unit on the basis of the output current output from the elements.

Accordingly, according to the electro-optical device of this aspect, when the electro-optical device operates, it is possible to detect each of the incident visible ray and the incident infrared ray which enter the display surface according to the position and form of the pointing unit. Thus, it is possible to improve the detection sensitivity of the pointing unit compared to the case of detecting the pointing unit by using a single light-receiving element which can detect only a single kind of wavelength band of light.

In greater detail, for example, under the condition in which the daylight ray have strong intensity, at an region in which the pointing unit overlaps a portion of the display region, the intensity of the incident visible ray is relatively weak compared to the other region. Accordingly, the output current output from the first light-receiving element is lower than the output current of the first light-receiving element at the other region by a magnitude corresponding to the decreased intensity. At the portion of the display region which overlaps the pointing unit, the intensity of the incident infrared ray is stronger than that at the portion where the pointing unit does not overlap according to the intensity of the infrared ray radiated toward the display surface from the pointing unit, such as finger. Accordingly, under the condition in which the daylight ray have strong intensity, at the portion of the display region which overlaps the pointing unit, it is possible to more precisely specify the pointing unit on the basis of the sum of the decreased amount of the output current attributable to the decrease of the intensity of the incident visible ray which has relatively weak intensity compared to that of the other region, and the output current corresponding to the intensity of the incident infrared ray at the portion of the display region which is overlapped by the pointing unit.

Further, under the condition of the weak daylight ray, at the portion of the display region which is overlapped by the pointing unit, the reflected visible ray, which is reflected from the pointing unit, of the visible ray contained in the display ray radiated from the display surface is detected by the first light-receiving element. In addition, the second light-receiving element detects the reflected infrared ray reflected from the pointing unit of the infrared ray contained in the display rays radiated from the display surface. Accordingly, under the condition of weak a daylight ray, the reflected visible ray reflected from the pointing unit enter the display surface as the incident visible ray and the reflected infrared ray reflected from the pointing unit are also enter the display surface as the incident infrared ray. Here, owing to the weak intensity of the daylight ray, the intensity of the incident visible ray is weak and it can be considered that it is impossible to precisely specify the position of the pointing unit merely with the detection of the incident visible ray. However, according to the electro-optical device of the invention, since the second light-receiving element detects the reflected infrared ray reflected from the pointing unit as the incident infrared ray, it is possible to detect the pointing unit on the basis of the total output current obtained by adding the output current output from the second light-receiving element according to the incident infrared ray to the output current output from the first light-receiving element according to the incident visible ray.

Further, in a similar with the case in which the pointing unit can be precisely detected under each of the condition of a daylight ray with high intensity and the condition of daylight with weak intensity, even under the case in which the intensity of the daylight ray and the intensity of the display rays radiated from the display surface are almost equal to each other, both of the incident visible ray and the incident infrared rays are detected. Accordingly, the pointing unit is detected on the basis of the output current output from each of the light-receiving elements, and thus it is possible to acquire more precise information on the position and form of the pointing unit than the case of detecting the pointing unit on the basis of only the visible rays.

Accordingly, according to the electro-optical device of this aspect, for example, it is possible to surely detect the pointing unit regardless of the intensity of the daylight ray, and thus it is possible to improve the touch panel function of the electro-optical device.

In the electro-optical device, it is preferable that the first light-receiving element and the second light-receiving element are electrically connected in parallel with each other.

According to this aspect, since the incident visible ray and the incident infrared ray which entered the display surface are irradiated on the first and second light-receiving elements, respectively, the output current can be supplied to the detecting unit from each of these light-receiving elements. In addition, according to this aspect, a connecting unit, such as at a terminal portion by which the first light-receiving element and the second light-receiving element are electrically connected to each other, can be shared by these light-receiving elements, and thus it is possible to simplify the structure of the electro-optical device.

In the electro-optical device, it is preferable that the pixel portion have a pixel switching element including a first semiconductor layer formed in a first layer on the substrate, the first light-receiving element have a first light-receiving layer serving as a portion of a second semiconductor layer formed in the first layer, the second light-receiving element have a second light-receiving layer formed in a second layer which is different from the first layer, and the first semiconductor layer and the second semiconductor layer be formed by a common process.

In the electro-optical device, it is preferable that the pixel switching element is, for example, a semiconductor element, such as thin film transistor (TFT) including the first semiconductor layer formed in the first layer as an active layer. The first light-receiving layer that the first light-receiving element may serve as a portion of the second semiconductor layer formed in the same layer as the first layer in which the active layer of the pixel switching TFT is formed. On the other hand, the second light-receiving element has the second light-receiving layer formed in the second layer different from the first layer. Accordingly, the first light-receiving layer and the second light-receiving layer that the first light-receiving element and the second light-receiving element have respectively are formed in different layers on the substrate.

Since both of the first semiconductor layer and the second semiconductor layer are formed in the first layer on the substrate, they can be formed by a common process. In greater detail, after the first layer which is a semiconductor layer, such as a polysilicon layer, is formed, the semiconductor layer is patterned simultaneously or concurrently in a manner such that the first semiconductor layer and the second semiconductor layer become plane patterns corresponding to the layout of the pixel switching element and the first light-receiving layer, respectively. Accordingly, the first and second semiconductor layers can be formed by the common process.

Accordingly, according to this aspect, it is possible to simplify a manufacturing process of the electro-optical device compared to the case of forming the first and second light-receiving elements by separate processes, respectively.

In the electro-optical device, it is preferable that the electro-optical device further includes a visible ray filter which is formed at the display surface side when the electro-optical device is viewed from the second light-receiving element, overlaps the second light-receiving element, blocks the visible ray directing toward the display surface from the substrate, and allows the incident infrared ray to pass therethrough.

With such a structure, the visible ray filter blocks the visible ray directing toward the display surface from the substrate when displaying an image in the display region. Accordingly, it is possible to prevent a portion of the display region, at which the second light-receiving element is provided, from being displayed white (so-called white void display) and to improve the display quality of the image displayed by the electro-optical device.

In the electro-optical device, it is preferable that the electro-optical device further includes a light source unit which is placed on the opposite side of the display surface when the electro-optical device is viewed from the substrate side and radiates light source lays including a plurality of different colored rays and an infrared ray toward the display region, in which the pixel portion includes a plurality of sub-pixel portions having the plurality of color filters, respectively, which allows the plurality of colored rays to pass therethrough, respectively, each of the plurality of sub-pixel portions has a light modulation element which modulates the plurality of colored rays, and at least one color filter of the plurality of color filters may allow the infrared ray to pass therethrough.

According to this aspect, since the electro-optical device has the plurality of sub-pixel portions having the plurality of color filters, respectively which allows the plurality of colored rays to pass therethrough, respectively, it is possible to display a color image, for example, using a red colored ray, a green colored ray, and a blue colored ray according to the drive of the light modulation element, such as the liquid crystal element.

In addition, since at least one of the plurality of color filters can allow the infrared ray to pass therethrough, the infrared ray included in the light source rays is irradiated on the pointing unit when detecting the pointing unit. The infrared ray irradiated on the pointing unit is reflected from the pointing unit and enters the display surface as the incident infrared ray. Accordingly, under the condition in which the infrared ray is almost not contained in the daylight ray, for example, even under the condition in which the intensity of the infrared ray contained in the daylight ray as well as the intensity of the visible ray contained in the daylight ray in the case in which the intensity of the daylight ray is weak is weak, it is possible to detect the pointing unit using the incident infrared ray.

In the electro-optical device, it is preferable that the light source unit be a fluorescent device which converts a ultraviolet ray to the light source rays using a fluorescent material.

With such a structure, it is possible to easily generate the visible ray and the infrared ray by appropriately selecting the fluorescent material for the fluorescent device, such as a cold-cathode tube.

In the electro-optical device, it is preferable that the light source unit be a light-emitting device including a light-emitting element which radiates the light source rays according to input current.

With such a structure, it is possible to change the intensity of the light source rays according to the input current. Accordingly, it is possible to easily change the intensity of the visible ray and the infrared ray contained in the light source rays so as to be able to detect the pointing unit according to the intensity of the daylight ray.

In the electro-optical device, it is preferable that the light-emitting element is an organic electro-luminance (EL) element.

With such a structure, it is possible to set luminescence performance of the light-emitting device according to selection of the light-emitting material which forms the light-emitting layer and the layer forming condition.

In the electro-optical device, it is preferable that the light-emitting element be a semiconductor light-emitting element.

With such a structure, for example, it is possible to generate the light source rays using a light-emitting diode in which an inorganic semiconductor layer serves as the light-emitting layer. According to this aspect, it is possible to stably radiate the infrared ray from the start of lighting of the light-emitting device by using the light-emitting diode formed using particularly the inorganic semiconductor material.

In the electro-optical device, it is preferable that the pixel portion be composed of a plurality of sub-pixel portions which radiates a plurality of different colored rays, respectively, and at least one sub-pixel portion of the plurality of sub-pixel portions have a light-emitting element which radiates one colored ray of the plurality of colored rays and the infrared ray toward the display surface.

With such a structure, for example, it is possible to display a color image by the plurality of colored rays of a red colored ray, a green colored ray and a blue colored ray. Since at least one sub-pixel portion of the plurality of sub-pixel portions has a light-emitting element which radiates the infrared ray toward the display surface along with the one colored ray of the plurality of colored rays, it is possible to radiate the infrared ray toward the pointing unit from the display surface without additionally employing an element which radiates the infrared ray separately from the plurality of colored rays.

According to another aspect of the invention, there is an electronic apparatus including the electro-optical device.

According to the electronic apparatus of this aspect, since the electronic apparatus includes the above-mentioned electro-optical device, it is possible to realize various kinds of electronic apparatuses, such as a cellular phone having a touch panel function, an electronic organizer, a word processor, a viewfinder-type or monitor-direct-view type video recorder, a video-conferencing phone, and a POS terminal.

Other operations and advantages of the invention will be more apparently understood from the following description about embodiments of the invention.

BRIEF DESCRIPTION OF THE DRAWINGS

The invention will be described with reference to the accompanying drawings, wherein like numbers reference like elements.

FIG. 14 is a list showing a relationship between an intensity of daylight ray and output current of each of the light-receiving elements.

DESCRIPTION OF EXEMPLARY EMBODIMENTS

An electro-optical device and an electronic apparatus according to one embodiment of the invention will be described below with reference to the accompanying drawings.

First Embodiment

With this embodiment, a liquid crystal device having a touch panel function is presented as an example of the electro-optical device of the invention.

1-1: Entire Structure of Liquid Crystal Device

Figure 1:
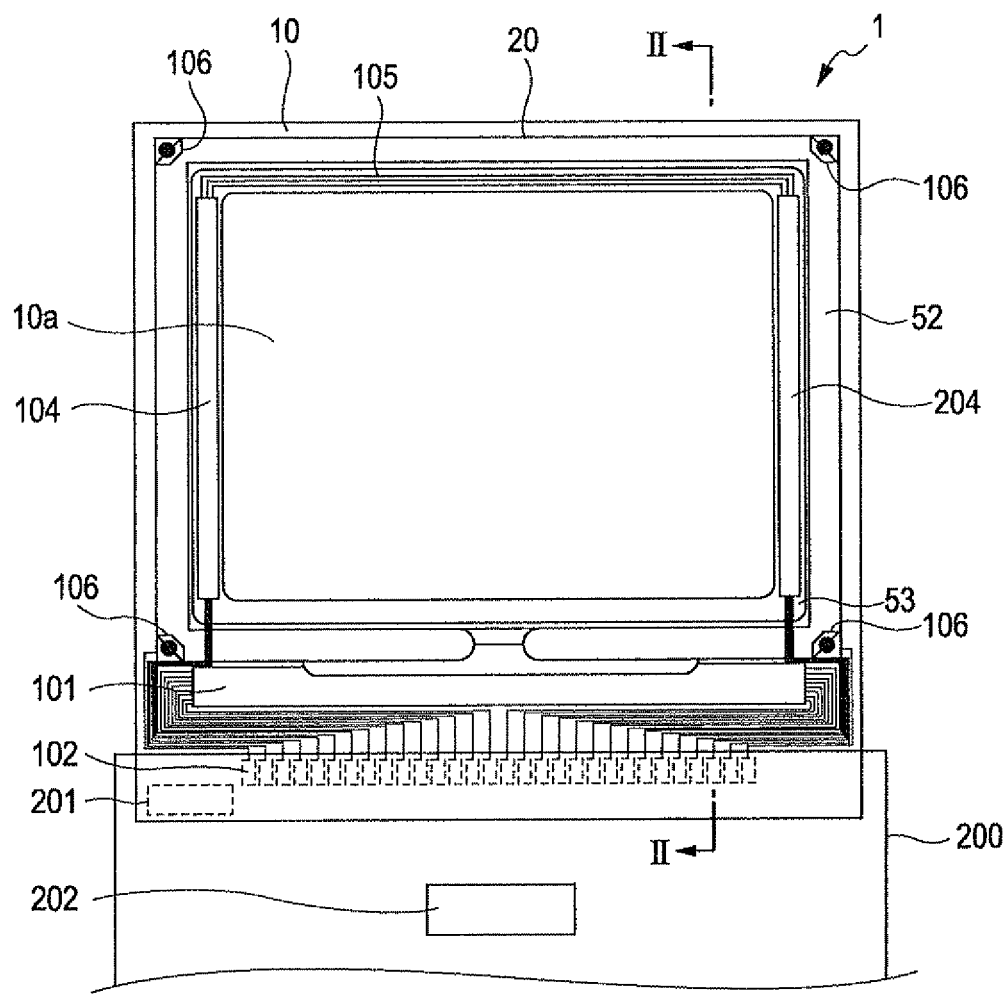
FIG. 1 is a plan view illustrating a liquid crystal device which is an electro-optical device according to a first embodiment of the invention.
Figure 2:
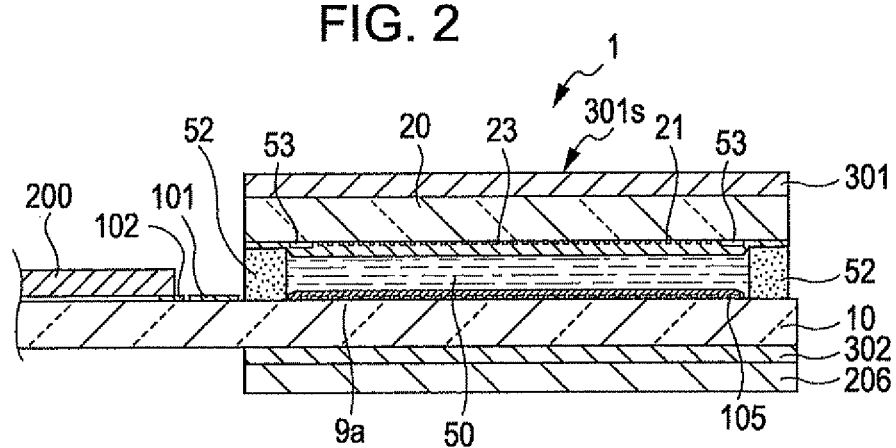
FIG. 2 is a sectional view taken along line II-II' of FIG. 1.

First of all, the entire structure of the liquid crystal device 1 according to this embodiment will be described with reference to FIGS. 1 and 2. FIG. 1 is a plan view illustrating the liquid crystal device 1 and shown from an opposing substrate 20 side. FIG. 1 particularly shows a thin film transistor (TFT) array substrate 10 and constituent parts formed on the TFT array substrate 10. FIG. 2 is a sectional view taken along line II-II' of FIG. 2. The liquid crystal device 1 according to this embodiment is driven in a TFT active matrix drive method of a drive circuit built-in-type.

In FIGS. 1 and 2, in the liquid crystal device 1, the TFT array substrate 10 and the opposing substrate 20 are arranged to face each other. A liquid crystal layer 50 is sealed between the TFT array substrate 10 and the opposing substrate 20. The TFT array substrate 10 and the opposing substrate 20 are bonded to each other by a sealing member 52 provided at a sealing region positioned around an image display region 10a which is a display region in which a plurality of pixel portions is provided.

The sealing member 52 is made of, for example, ultraviolet ray curable resin or heat curable resin in order to bond both substrates to each other, and is cured by ultraviolet ray radiation or heating after it is coated on the TFT array substrate 10 in a manufacturing process. Gap members such as glass fiber or glass beads are distributed in the sealing member 52 in order to maintain gap between the TFT array substrate 10 and the opposing substrate 20 (inter-substrate gap) to a predetermined value.

A frame light shielding film 53 having a light shielding characteristic and defining a frame region of the image display region 10a is provided at the opposing substrate 20 side at the inner side of the sealing region at which the sealing member 52 is provided in parallel with the light shielding film 53. A portion of the frame light shielding film 53 or the entire frame light shielding film 53 may be provided at the TFT array substrate 10 side as an embedded light shielding film. Further, a peripheral region placed around the image display region 10a exists. In other words, in this embodiment, a region farther than the frame light shielding film 53 from the center of the TFT array substrate 10 is particularly specified as the peripheral region.

The liquid crystal device 1 includes a data line drive circuit 101, a scan line drive circuit 104, and a sensor scan circuit 204. At a portion of the peripheral region disposed outside the sealing region at which the sealing member 52 is placed, the data line drive circuit 101 and an external circuit connection terminal 102 are provided along one side of the TFT array substrate 10. The scan line drive circuit 104 is provided along two sides adjacent to the side of the TFT array substrate 10 in a manner of being covered with the frame light shielding film 53. The sensor scan circuit 204 is provided in a manner of facing the scan line drive circuit 104 with the image display region 10a interposed therebetween. The scan line drive circuit 104 and the sensor scan circuit 204 are electrically connected to each other by a plurality of wirings 105 formed so as to cover the frame light shielding film 53.

A control circuit portion 201 is formed at the peripheral region on the TFT array substrate 10. The control circuit portion 201 processes an output signal output from an optical sensor portion which will be described below, and includes a circuit portion which controls the stop amount of light quantity by a light quantity adjusting portion. The control circuit portion 201 or a received-light signal processing circuit portion 215 which is a portion of the function of the control circuit portion 201 may be integrally formed with the data line drive circuit 101 in order to simplify the connection with the image display region 10a.

The external circuit connection terminal 102 is connected to a connection terminal provided in a flexible printed circuit (FPC) board 200 which is an example of a connection unit for electrically connecting the external circuit and the liquid crystal device 1 to each other. A backlight of the liquid crystal device 1 is controlled by a backlight control circuit 202 composed of IC circuits mounted on the FPC board 200.

Four corner portions of the opposing substrate 20 are provided with upper-lower interconnection members 106 which function as upper-lower interconnection terminals between the TFT array substrate 10 and the opposing substrate 20. On the other hand, corner portions of the TFT array substrate 10 are provided with upper-lower interconnection terminals, respectively, at positions corresponding to the upper-lower interconnection members. Thanks to this structure, the TFT array substrate 10 and the opposing substrate 20 can be electrically conducted.

In FIG. 2, an aligning film is formed on the TFT array substrate 10, particularly on pixel electrodes 9a, after wirings such as TFTs, scan lines, and data lines are formed on the TFT array substrate 10. On the other hand, the opposing substrate 20 is also provided with an opposing electrode 21, a lattice shape or stripe shape light shielding film 23, and an aligning film which is the uppermost layer. The liquid crystal layer 50 is composed of liquid crystals which are one kind of or a plural kinds of nematic liquid crystals which are mixed, and takes a predetermined alignment state between a pair of the aligning films.

The liquid crystal device 1 includes a first polarizing plate 301, a second polarizing plate 302, and a backlight 206 which is an example of "light source unit" of the invention. The first polarizing plate 301 is placed on the opposing substrate 20. The second polarizing plate 302 is placed between the backlight 206 and the TFT array substrate 10 at a lower side of the TFT array substrate 10 of the drawings. The liquid crystal device 1 displays an image on a display surface 301s placed at a side which does not face the opposing substrate 20 of both sides of the first polarizing plate 301 during operation of the liquid crystal device 1.

Besides the circuit portions, such as the data line drive circuit 101 and the scan line drive circuit 104, the TFT array substrate 10 shown in FIGS. 1 and 2 is further provided with a sampling circuit which samples an image signal on an image signal line and supplies it to the data lines, a pre-charge circuit which supplies precharge signals having a predetermined voltage level to the plurality of data lines, respectively ahead of the supply of the image signals, and a test circuit for testing quality and defects of the electro-optical device in the middle of manufacturing and at the time of shipment.

1-2: Circuit Structure of Liquid Crystal Device

Figure 3:
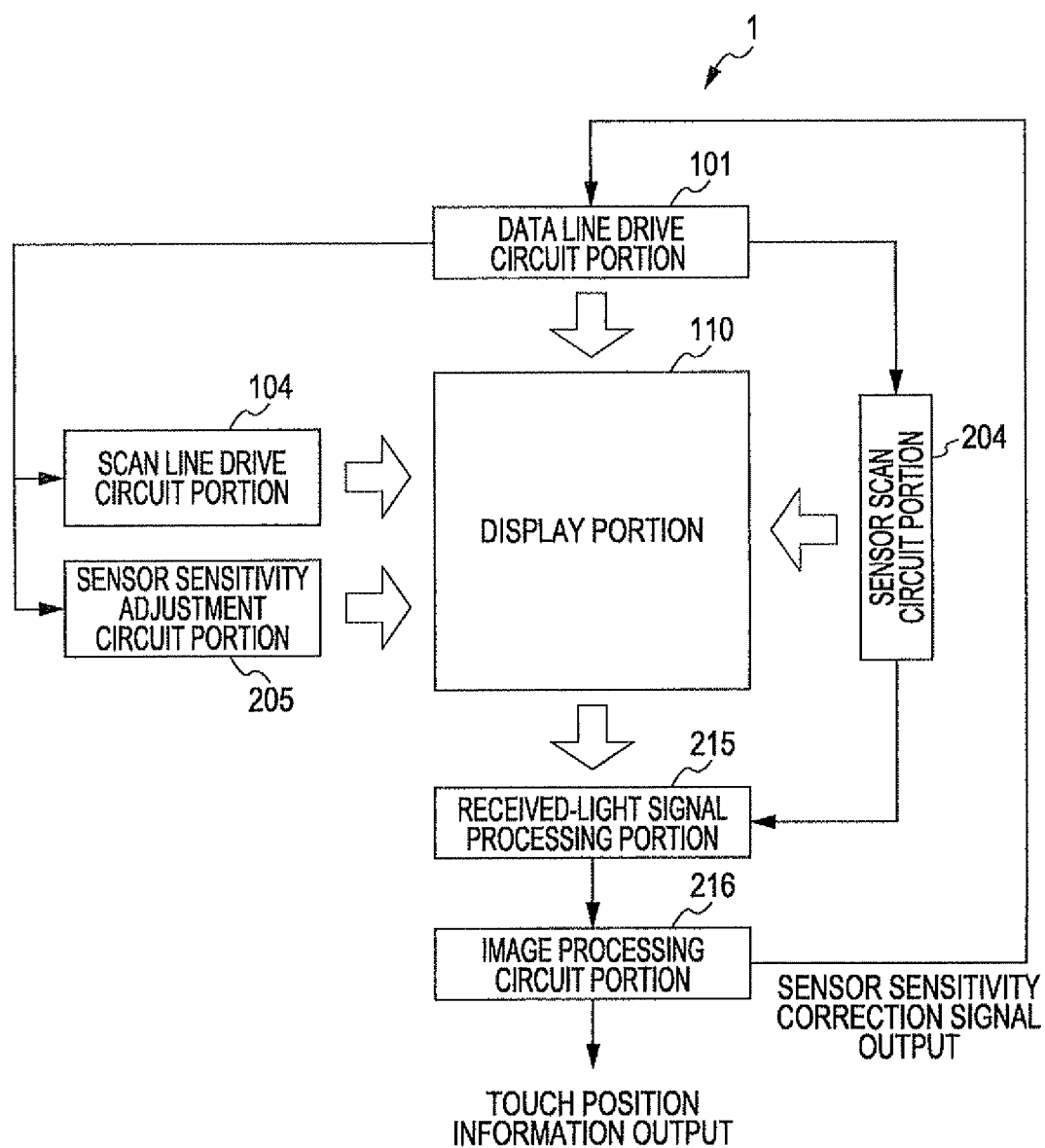
FIG. 3 is a block diagram illustrating a main circuit structure of the liquid crystal device which is the electro-optical device according to the first embodiment of the invention.

Next, the circuit structure of the liquid crystal device 1 will be described with reference to FIG. 3. FIG. 3 is a block diagram illustrating the main circuit structure of the liquid crystal device 1.

In FIG. 3, the liquid crystal device 1 includes a data line drive circuit portion 101, a scan line drive circuit portion 104, a sensor sensitivity adjustment circuit portion 205, a sensor scan circuit portion 204, a received-light signal processing circuit 215, an image processing circuit portion 216, and a display portion 110. The control circuit portion 201 shown in FIG. 1 includes the sensor sensitivity adjustment circuit portion 205, the received-light signal processing circuit portion 215, and the image processing circuit portion 216.

The display portion 110 is composed of a plurality of pixel portions 72 arranged in a matrix described later. The data line drive circuit 101 and the scan line drive circuit 104 supply scan signals and image signals to the display portion 110 at predetermined timing, and drive each of the pixel portions. The sensor scan circuit portion 204 supplies a signal for operating optical sensor portions which will be described below to each of the optical sensor portions while the liquid crystal device 1 operates.

The received-light signal processing circuit portion 215 forms an example of "detecting unit" of the invention along with the image processing circuit portion 216. The received-light signal processing portion 215 processes a received-light signal output from the optical sensor portion provided at the image display region 10a on the TFT array substrate 10. The image processing circuit portion 216 processes image data generated based on the processed signal supplied from the received-light signal processing circuit portion 215. The image processing circuit portion 216 specifies position of the pointing unit which points the display surface 301s at the image display region 10a and outputs the specified position of the pointing unit to the external circuit portion as touch position information in the case of being capable of identifying a pointing unit such as a finger which points the display surface 301s from the image specified on the basis of each of the received-light signal of each of the plurality of optical sensors provided in the display portion 110. On the other hand, the image processing circuit portion 216 supplies a correction signal for correcting the sensitivity of the optical sensor portion to the data line drive circuit 101 in the case not being capable of specifying the position of the pointing unit. On the basis of this correction signal, the stop amount of light quantity of incident ray, i.e. the amount of light quantity stopped by a light quantity adjustment portion, is adjusted for each of the light quantity adjustment portions.

1-3: Concrete Structure of Liquid Crystal Device

Figure 4:
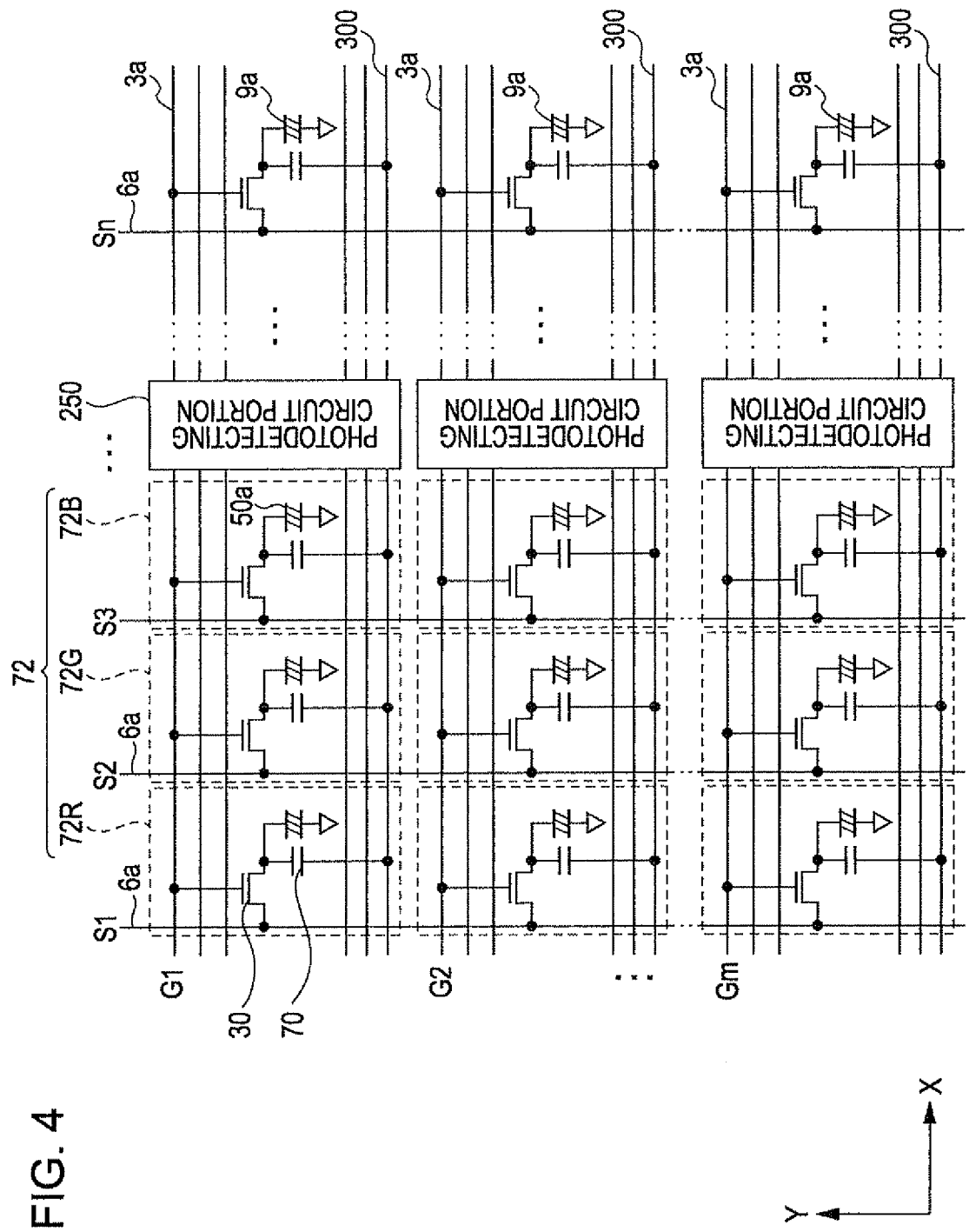
FIG. 4 is an equivalent circuit diagram of an image display region of the liquid crystal device which is the electro-optical device according to the first embodiment.
Figure 5:
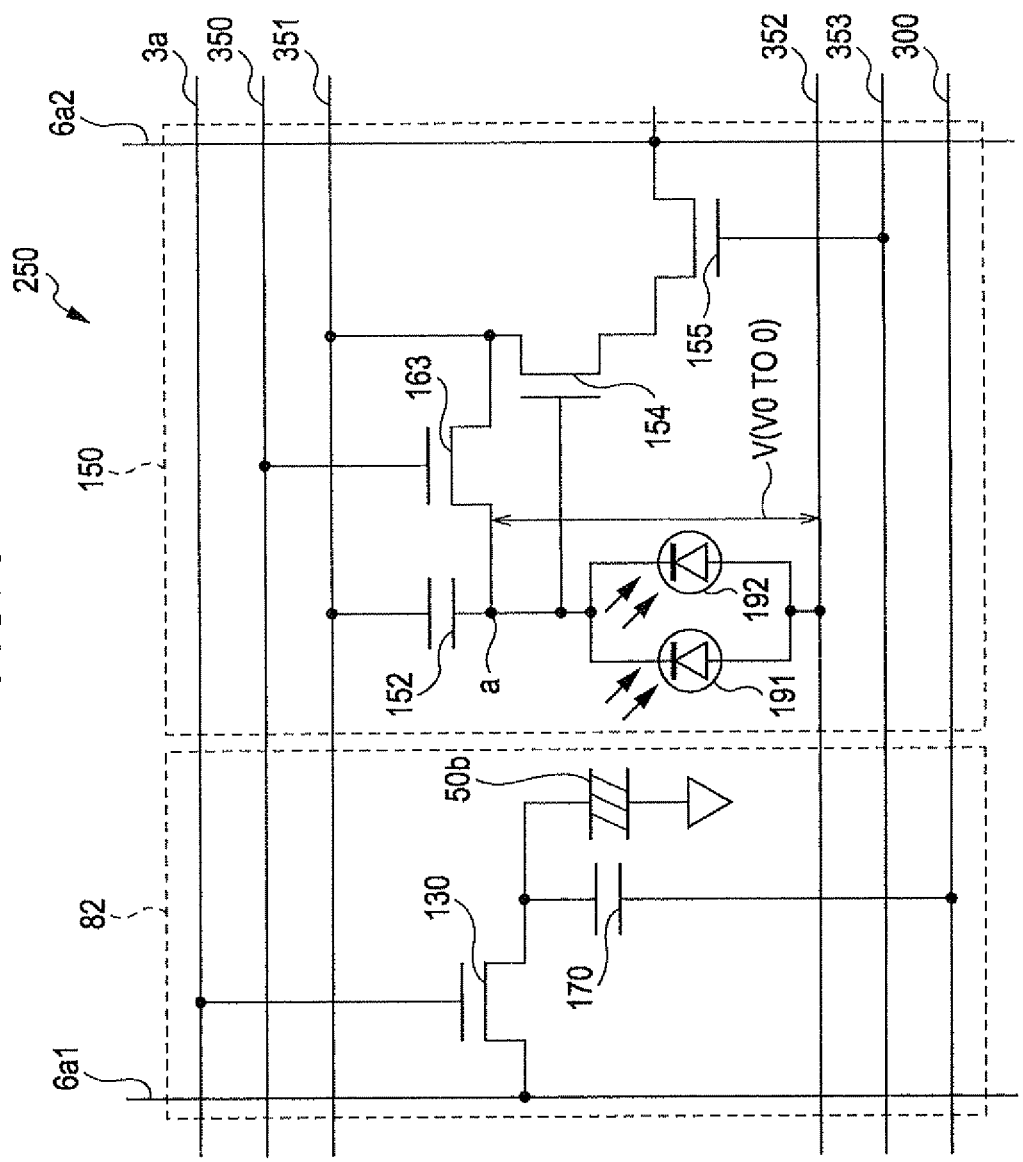
FIG. 5 is a circuit diagram illustrating a concrete electrical structure of a photodetecting circuit portion.
Figure 6:
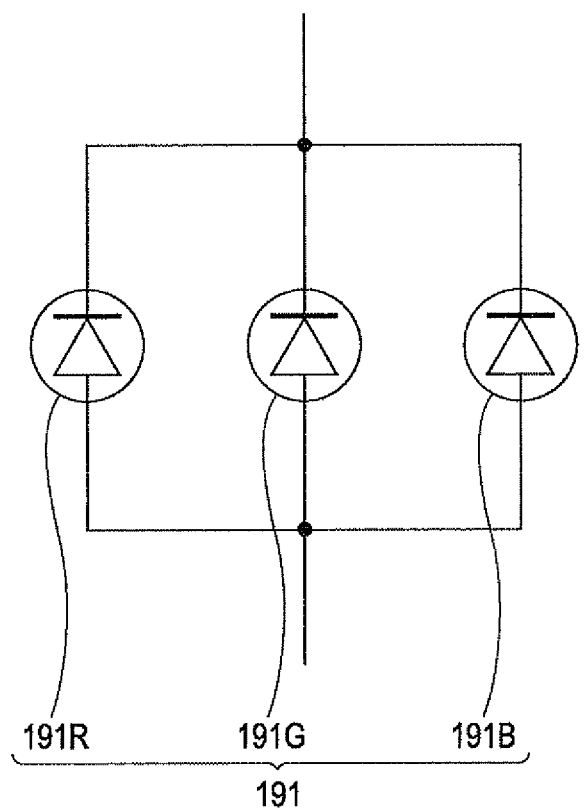
FIG. 6 is a circuit diagram illustrating an electrical structure of a light-receiving element portion.
Figure 7:
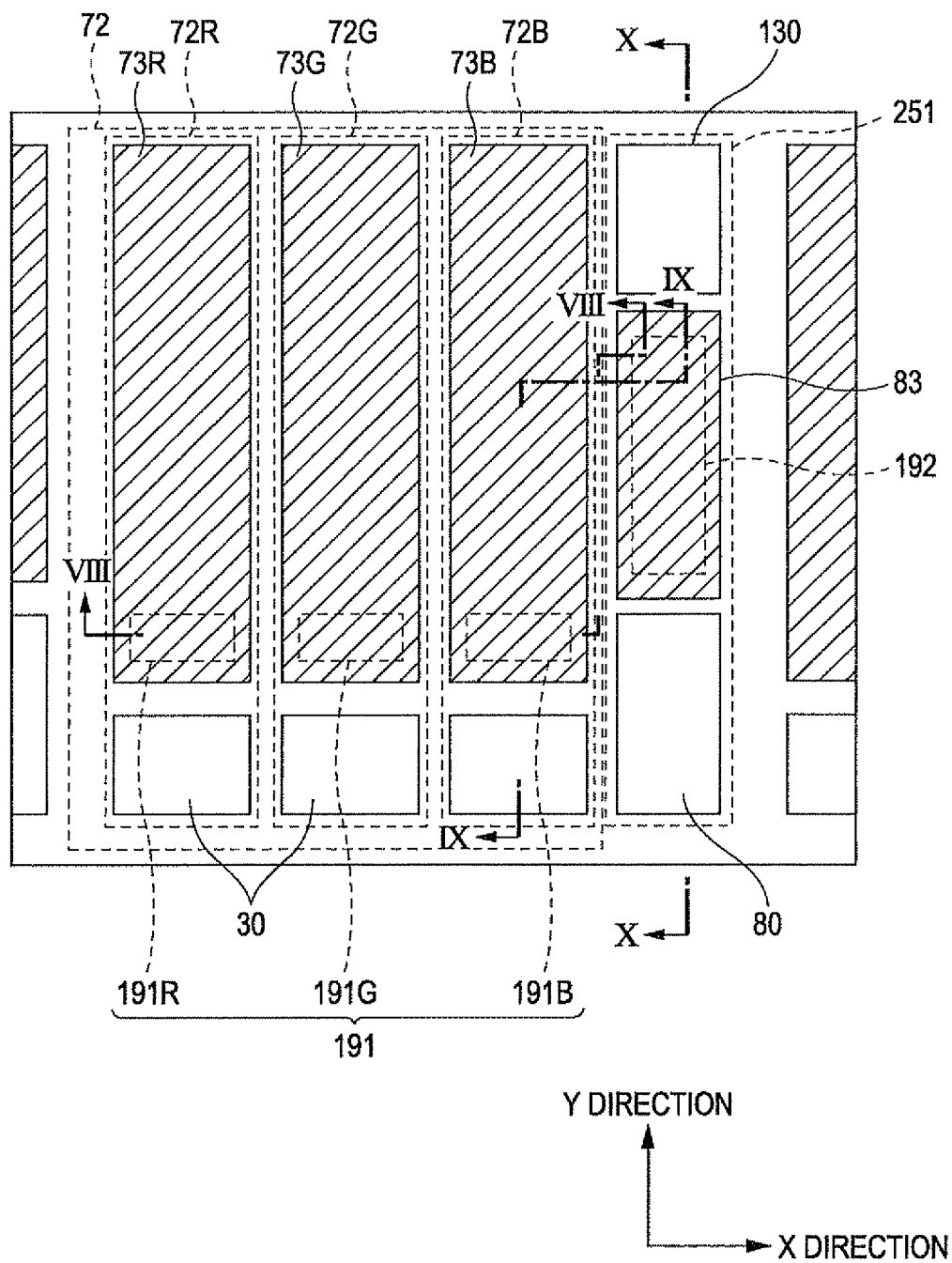
FIG. 7 is a schematic plan view illustrating a pixel portion of the liquid crystal device which is the electro-optical device according to the first embodiment of the invention.
Figure 8:
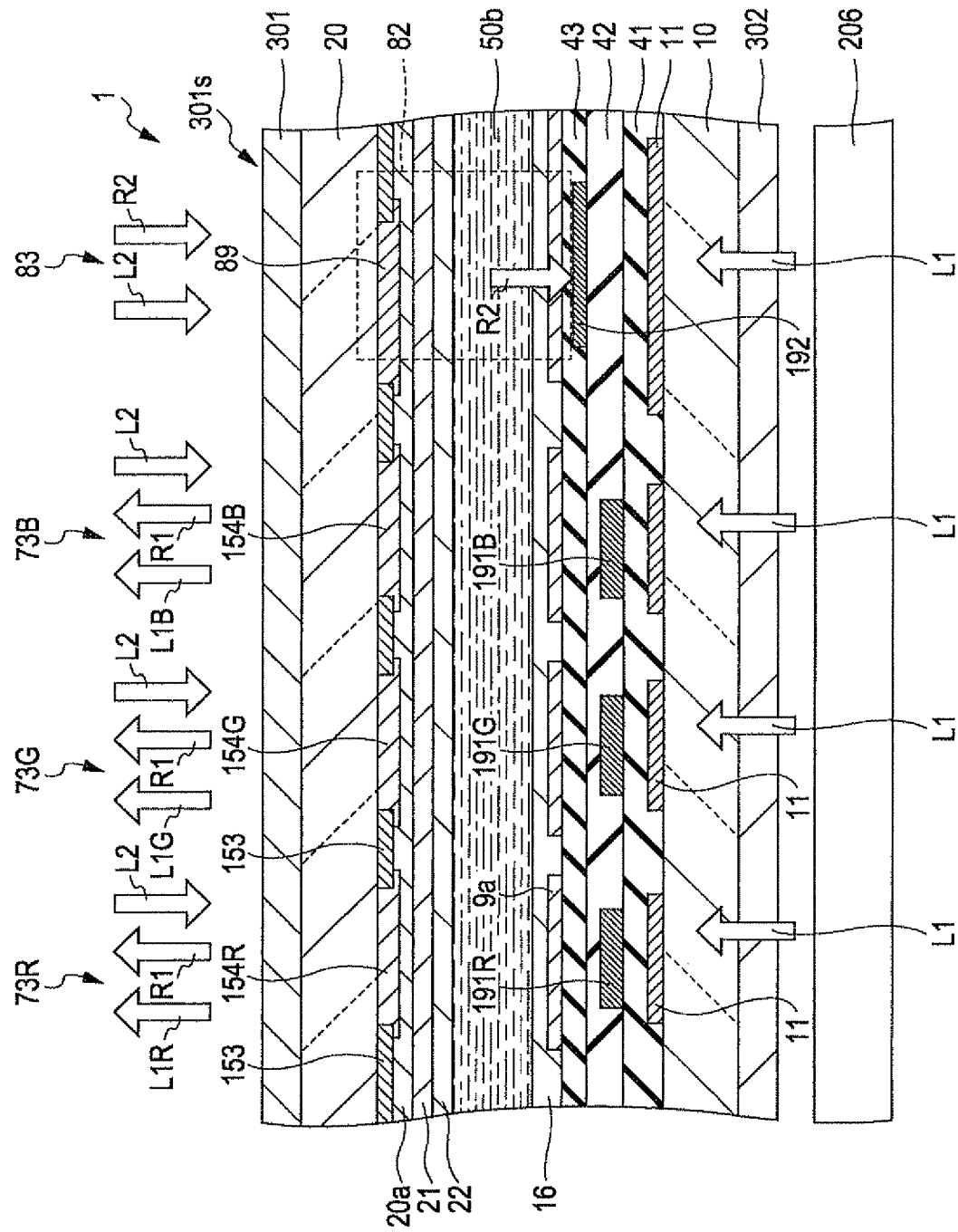
FIG. 8 is a sectional view taken along line VIII-VIII' of FIG. 7.
Figure 9:
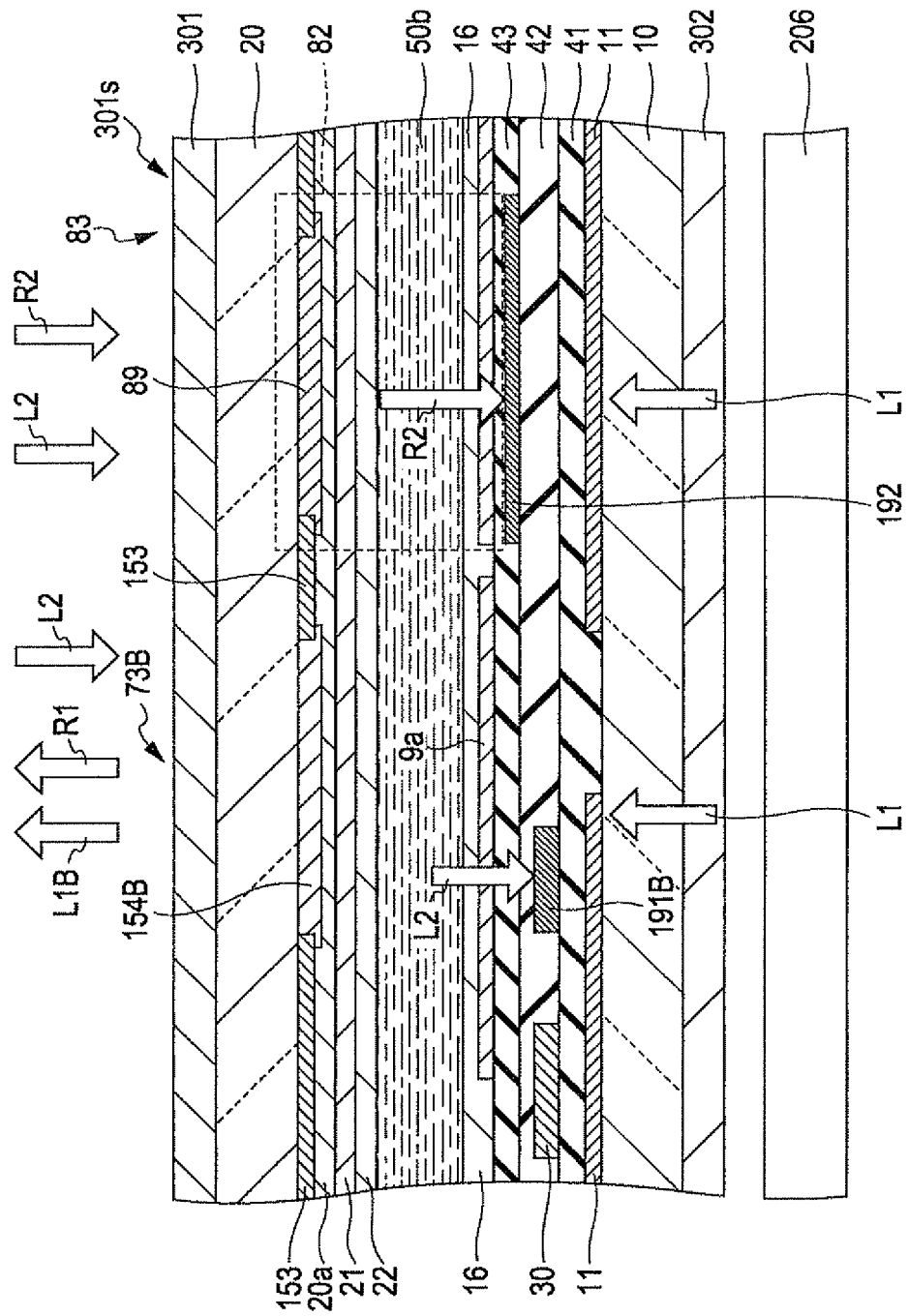
FIG. 9 is a sectional view taken along line IX-IX' of FIG. 7.
Figure 10:
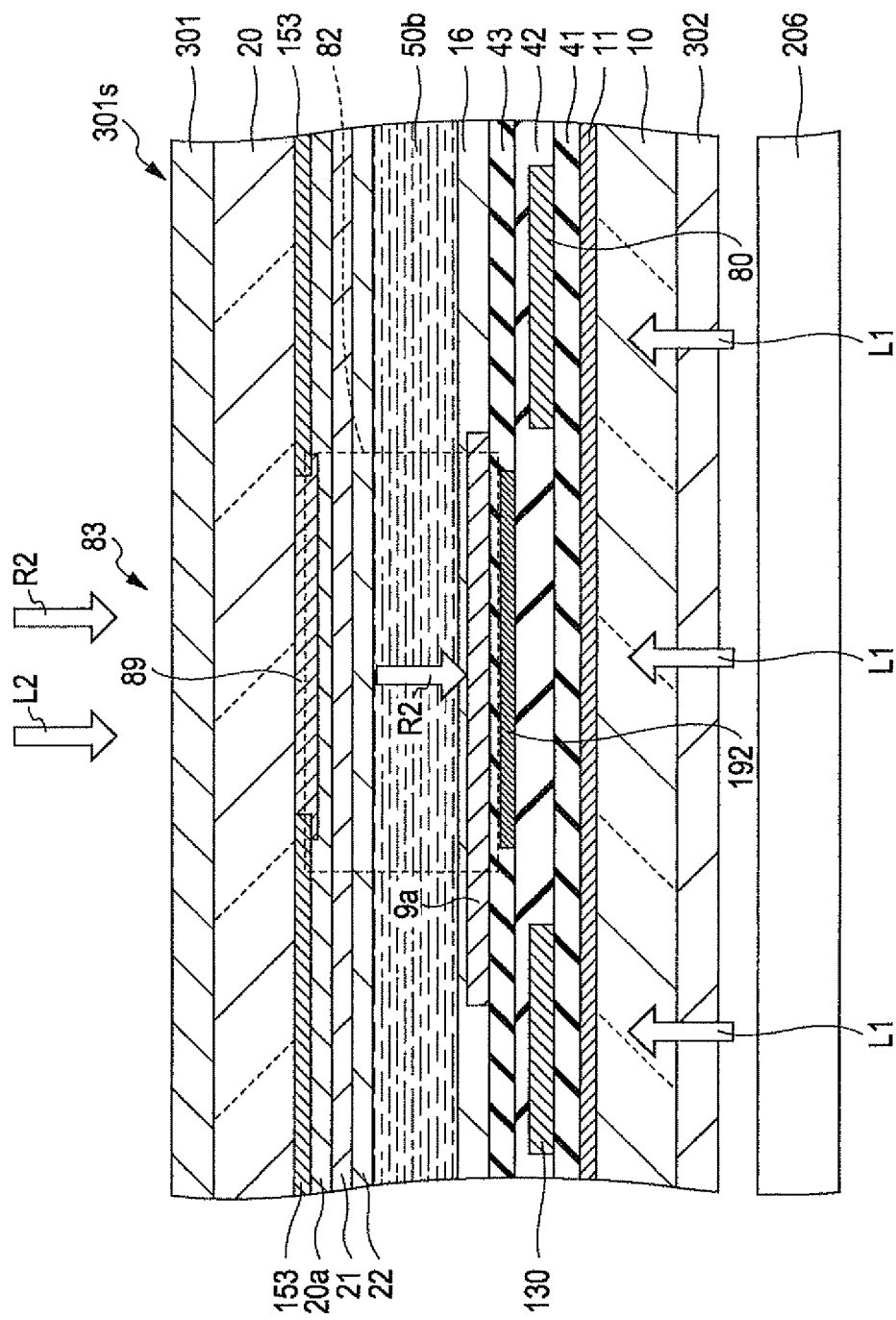
FIG. 10 is a sectional view taken along line X-X' of FIG. 7.
Figure 11:
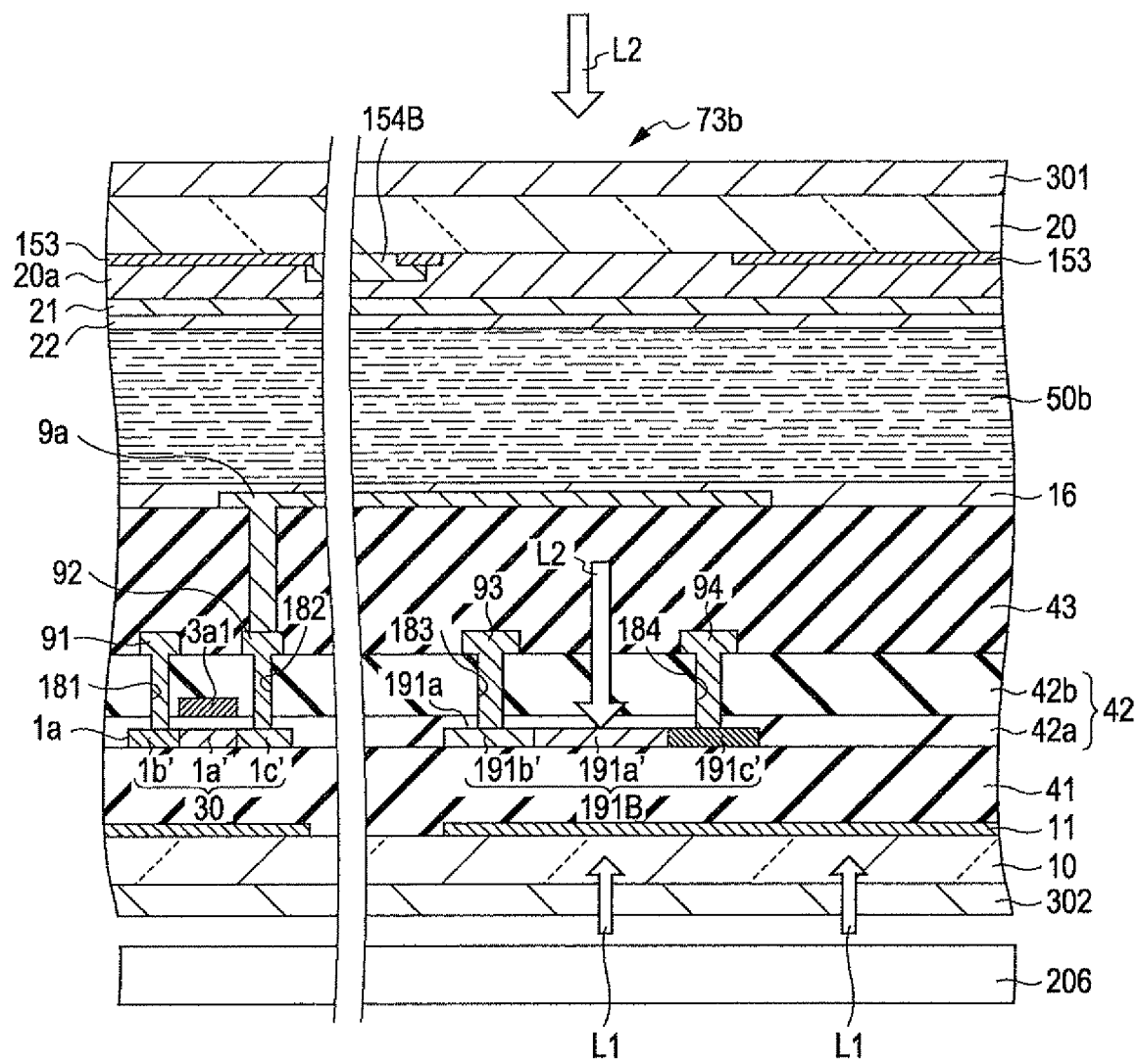
FIG. 11 is a partial sectional view illustrating a portion of the section shown in FIG. 9 in detail.
Figure 12:
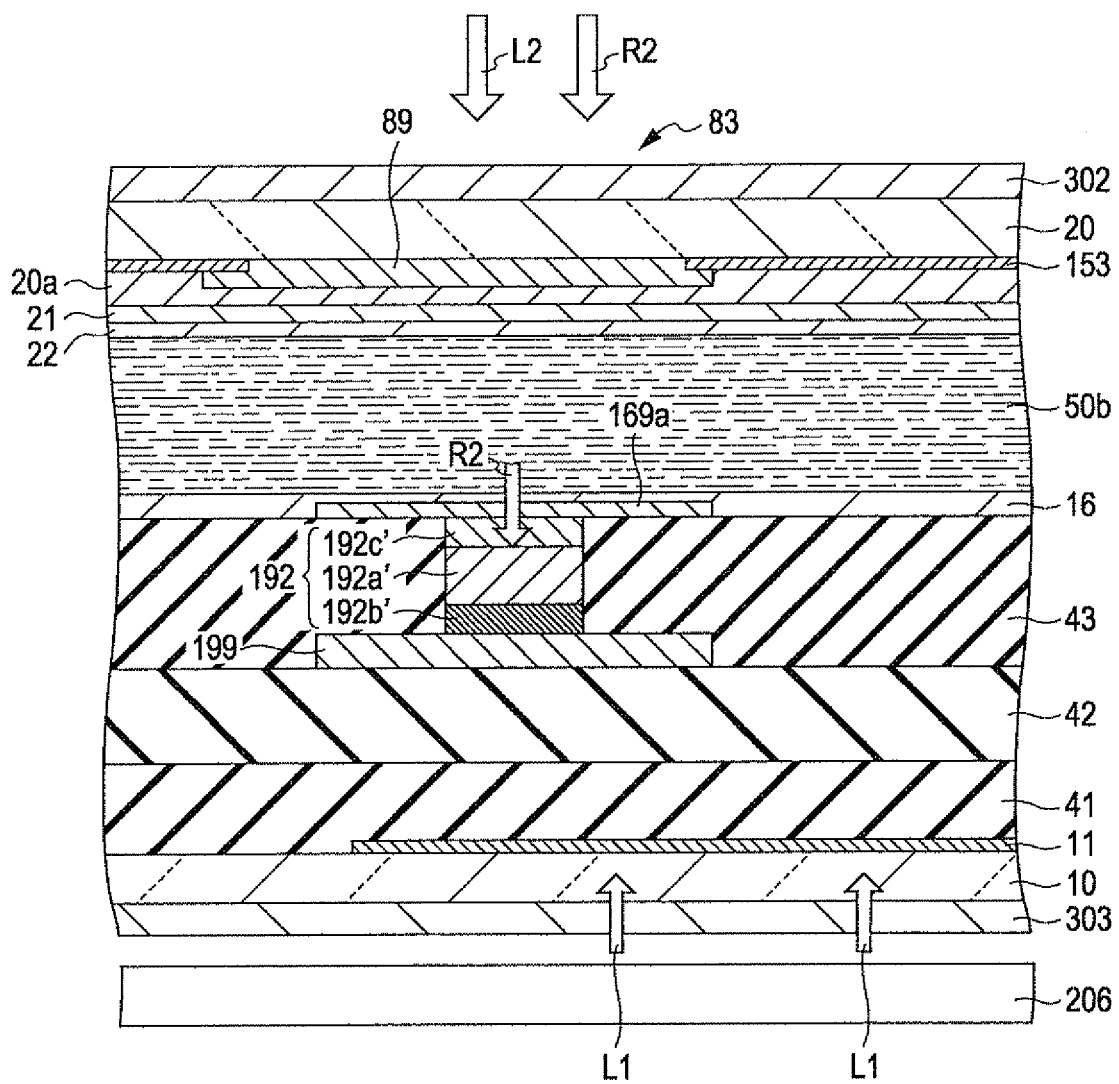
FIG. 12 is a sectional view illustrating a structure of various kinds of elements at a portion of the section shown in FIG. 10 in detail.

Next, with reference to FIGS. 4 to 11, the structure of the liquid crystal device 1 will be described in detail. FIG. 4 is an equivalent circuit diagram of various elements and wirings at the image display region 10a of the liquid crystal device 1. FIG. 5 is a circuit diagram illustrating the electrical structure of the photodetecting circuit portion shown in FIG. 4 in detail. FIG. 6 is a circuit diagram illustrating the electrical structure of the light-receiving element portion 191. FIG. 7 is a schematic plan view illustrating a pixel portion. FIG. 8 is a sectional view taken along line VIII-VIII' of FIG. 7. FIG. 9 is a sectional view taken along line IX-IX' of FIG. 7. FIG. 10 is a sectional view taken along line X-X'. FIG. 11 is a partial sectional view illustrating the detailed structure of a portion of the section shown in FIG. 9. FIG. 12 is a sectional view illustrating the detail of various elements at a portion of the section shown in FIG. 10.

FIG. 4 shows a photodetecting circuit portion along with a circuitry structure of a portion of a plurality of pixel portions placed in the matrix form on the TFT array substrate 10, the portion substantially contributing to the display of the image. In FIGS. 7 to 11, in order to illustrate various layers and members in a recognizable size, scales are differently set for each of layers and each of members. Each of light-receiving elements 191R, 191G, and 191B which constitute the light-receiving element 191 is placed physically at each of sub-pixel portion. However, in order to simplify the explanation, in FIGS. 4 and 5, the light-receiving elements 191R, 191G, and 191B are shown in the state in which they are included in the photodetecting circuit portions 250 electrically connected to the plurality of sub-pixel portions 72R, 72G, and 72B, respectively.

With reference to FIG. 4, the circuitry structure of the pixel portion 72 will be described. In FIG. 4, each of the plurality of pixel portion 72 formed in a matrix constituting the image display region 10a of the liquid crystal device 1 is structured including a sub-pixel portion 72R for displaying a red color, a sub-pixel portion 72G for displaying a green color, or a sub-pixel 72B for displaying a blue color. Accordingly, the liquid crystal device 1 is a display device which can display a color image. Each of the sub-pixel portions 72R, 72G, and 72B is electrically connected to each of the plurality of photodetecting circuit portions 250 formed within the image display region 10a.

Each of the sub-pixel portions 72R, 72G, and 72B includes a pixel electrode 9a, a TFT 30 which is an example of "pixel switching element" of the invention, and a liquid crystal element 50a which is an example of "light modulation element" of the invention.

The TFT 30 is electrically connected to the pixel electrode 9a and switching-controls the pixel electrode 9a while the liquid crystal device 1 operates. The data line 6a supplied with the image signal is electrically connected to a source of the TFT 30. Image signals S1, S2, . . . , and Sn written into the data lines 6a may be sequentially supplied in this order, or may be simultaneously supplied to a plurality of data lines 6a adjacent to one another and belonging to the same group.

The scan lines 3a are electrically connected to gates of the TFTs 30, respectively. The liquid crystal device 1 is structured so as to apply scan signals G1, G2, . . . , and Gm to the scan lines 3a in this order at predetermined timing in a pulse manner. The pixel electrodes 9a are electrically connected to drains of the TFTs 30, respectively. The image signals S1, S2, . . . , and Sn supplied from the data lines 6a are written at predetermined timing by closing the switch, the TFT 30 which is a switching element, for a predetermined period. The image signals S1, S2, . . . , and Sn having predetermined levels and written into the liquid crystals via the pixel electrodes 9a are maintained between the pixel electrodes 9a and the opposing electrode formed on the opposing substrate for a predetermined period.

The liquid crystal element 50a modulates light source rays (i.e. light radiated toward the sub-pixel portions from the backlight 206) by changing orientation and order of molecules of molecular association according to the applied voltage level and enables gradation display. In the case of a normal white mode, transmittance with respect to the light source rays decreases according to the voltage applied in the unit of a sub-pixel portion. In the case of a normal black mode, the transmittance with respect to the light source rays increases according to the voltage applied in the unit of the sub-pixel portion. As a result, the liquid crystal device 1 radiates a display ray having contrast depending on the image signal as a whole. A storage capacitor 70 is additionally provided in parallel with the liquid crystal element 50a formed between the pixel electrode 9a and the opposing electrode in order to prevent the image signal from leaking. A capacitor electrode line 300 is an electrode at a fixed potential side of a pair of electrodes of the storage capacitor 70.

Next, the detailed circuitry structure of the photodetecting circuit portion 250 will be described with reference to FIGS. 5 and 6.

In FIG. 5, the photodetecting circuit portion 250 includes a light quantity adjustment portion 82 and an optical sensor portion 150.

The light quantity adjustment portion 82 includes a liquid crystal element 50b, an adjustment control TFT 130, and a storage capacitor 170. The light quantity adjustment portion 82 is included in each of the plurality of photodetecting circuit portions 250. The light quantity adjustment portions 82 are individually controlled in the image display region 10a under the control of the control circuit portion 201.

The liquid crystal element 50b is electrically connected to both of the adjustment control TFT 130 and the storage capacitor 170, the alignment state of the liquid crystal portion of the liquid crystal element 50b is controlled by the adjustment control TFT 130, and the light quantity of the incident visible ray which enters the optical sensor portion 150 from the display surface 301s is adjusted. An electrode of the pair of electrodes of the storage capacitor 170 is electrically connected to a fixed potential line 300.

A gate and a source of the adjustment control TFT 130 are electrically connected to the scan line 3a and the signal line 6a1, respectively. The adjustment control TFT 130 is structured in a manner such that it is switched on and off as a selection signal supplied via the scan line 3a is supplied. The adjustment control TFT 130 supplies an adjustment signal supplied via the signal line 6a1 to the liquid crystal element 50b according to the on and off states. The alignment state of the liquid crystal portion of the liquid crystal element 50b is controlled according to the adjustment signal, and thus controls the light quantity of the incident visible ray which enters the optical sensor portion 150.

The optical sensor portion 150 includes the light-receiving element 192 which is an example of "second light-receiving element" of the invention, the storage capacitor 152, the reset TFT 163, the signal amplifying TFT 154, and the output control TFT 155. The optical sensor portion 150 includes the light-receiving element portion 191 including the light-receiving elements 191R, 191G, and 191B (see FIG. 6), each of which is an example of "first light-receiving element" of the invention.

Here, the electrical structure of the light-receiving element portion 191 will be described with reference to FIG. 6.

As shown in FIG. 6, the light-receiving element portion 191 is composed of the light-receiving elements 191R, 191G, and 191B placed in the sub-pixel portions 72R, 72G, and 72B, respectively. Each of the light-receiving elements 191R, 191G, and 191B are electrically connected in parallel with one another. Each of the light-receiving elements 191R, 191G, and 191B receives the incident visible ray which enters each of the sub-pixel portions from the display surface 301s while the liquid crystal device 1 operates. Each of the light-receiving elements 191R, 191G, and 191B outputs output current according to the incident visible ray which enters each of the sub-pixel portions while the liquid crystal device 1 operates.

Returning to FIG. 5, a source, a gate, and a drain of the reset TFT 163 are electrically connected to the light-receiving element portion 191 and the light-receiving element 192, the reset signal line 350, and the signal amplifying TFT 154, respectively. A source, a gate, and a drain of the signal amplifying TFT 154 are electrically connected to a power source line 351, the light-receiving element portion 191 and the light-receiving element 192, and the output control TFT 155, respectively. A source, a gate, and a drain of the output control TFT 155 are electrically connected to the signal amplifying TFT 154, the selection signal line 353, and a read-out signal line 6a2, respectively.

While the liquid crystal device 1 operates, when at least one of the light-receiving elements 191R, 191G, and 191B constituting the light-receiving element portion 191 detects the incident visible ray, photocurrent generated in the corresponding light-receiving element is output from the corresponding light-receiving element as the output current. When the light-receiving element 192 detects the incident infrared ray which enters the display surface 301s, the photocurrent generated in the light-receiving element 192 is output as the output current.

The output current output from each of the light-receiving element portion 191 and the light-receiving element 192 is converted to a signal corresponding to a voltage V between the power source line 352 and a node a electrically connected to the light-receiving element portion 191 and the light-receiving element 192 according to operation of each of the reset TFT 163, the voltage amplifying TFT 154, and the output control TFT 155, and the converted signal is read out on the read signal line 6$a$2. Accordingly, the voltage V read to the read signal line 6$a$2 is specified by the output current output from each of the light-receiving element portion 191 and the light-receiving element 192.

Next, the detailed structure of the liquid crystal device 1 will be described with reference to FIGS. 7 to 12.

In FIG. 7, the pixel portion 72 includes three sub-pixel portions 72R, 72G, and 72B arranged in an X direction, the light-receiving elements 191R, 191G, and 191B, and the infrared ray detecting portion 251. The light-receiving elements 191R, 191G, and 191B and the infrared ray detecting portion 251 constitute the above-mentioned photodetecting portion 250.

The sub-pixel portions 72R, 72G, and 72B have openings 73R, 73G, and 73B, respectively. Each of the sub-pixel portions 72R, 72G, and 72B has the TFT 30 which switching-controls operation of each sub-pixel portion. The sub-pixel portions 72R, 72G, and 723 radiate a red colored ray, a green colored ray, and a blue colored ray through the openings 73R, 73G, and 73B, respectively according to the on/off operation of the TFT 30 while the liquid crystal device 1 operates, and enable the color image to display by the liquid crystal device 1.

The light-receiving elements 191R, 191G, and 191B are placed so as to face the openings 73R, 73G, and 73B, respectively, and to correspond to the sub-pixel portions, respectively. The light-receiving elements 191R, 191G, and 191B receive the incident visible ray which enters the openings 73R, 73G, and 73B, respectively from the display surface 301$s$ while the liquid crystal device 1 operates. Placement of the light-receiving elements 191R, 191G, and 191B is not limited to the scheme in which they are placed so as to correspond to the sub-pixel portions 72R, 72G, and 72B, respectively. Alternatively, the light-receiving elements 191R, 191G, and 191B may be placed not to overlap the infrared ray detecting portion 251 within the image display region 10$a$. The light-receiving element constituting the light-receiving element portion 191 is not limited to the case in which the light-receiving elements are placed so as to correspond to the sub-pixel portions, respectively. That is, the placement and number thereof are not limited to the placement and number of the light-receiving elements 191R, 191G, and 191B according to this embodiment as long as they are separately provided from the infrared ray detecting portion 251 in the image display region 10$a$.

The infrared ray detecting portion 251 has an adjustment control TFT 130, an opening 83, and a TFT circuit portion 80. The light-receiving element 192 is placed so as to face the opening 83 and receives the incident infrared ray which enters the display surface 301$s$. The TFT circuit portion 80 is structured including a reset TFT 163, a voltage amplifying TFT 154, and an output control TFT 155 (see FIG. 5). The TFT circuit portion 80 controls operation of the light-receiving element 192 which faces the opening 83 and operation of each of light-receiving elements 191R, 191G, and 191B and outputs the change of the voltage V depending on the output current output from each of the light-receiving elements 191R, 191G, and 191B and 192 according to the corresponding ray of the incident visible ray and the incident infrared ray to the read line 6$a$2.

In FIGS. 8 to 10, the liquid crystal device 1 includes light shielding films 11 and 153, three kinds of color filters 154R, 154G, and 154B buried in a planarization film 20$a$, a visible ray filter 89, the liquid crystal element 50$b$, the light-receiving elements 191 and 192, the backlight 206 which is an example of "light source unit" of the invention, the first polarizing plate 301, and the second polarizing plate 302.

The backlight 206 is placed on the opposite side of the display surface 301$s$ when the liquid crystal device 1 is viewed from the TFT array substrate 10 side. The backlight 206 radiates light source rays L1 including a red colored ray, a green colored ray, a blue colored ray, and an infrared ray toward the image display region 10$a$ while the liquid crystal device 1 operates.

The plurality of sub-pixel portions 72R, 72G, and 72B have the plurality of color filters 154R, 154G, and 154B, respectively, which allow colored rays, such as the red colored ray, the green colored ray, and the blue colored ray to pass therethrough. Each of the plurality of color filters 154R, 154G, and 154B transmits one of the red colored ray L1R, the green colored ray L1G, and the blue colored ray L1B included in the light source rays L1 modulated by the liquid crystal element corresponding to each sub-pixel portion while the liquid crystal device 1 operates, respectively. Accordingly, the liquid crystal device 1 can display a color image using the red colored ray L1R, the green colored ray L1G, and the blue colored ray L1B according to the drive of the liquid crystal element.

The color filters 154R, 154G, and 154B can transmit the infrared ray R1 included in the light source rays L1 therethrough. Accordingly, when detecting the pointing unit which points the display surface 301$s$, the infrared ray R1 included in the light source rays L1 is irradiated on the pointing unit. The infrared ray R1 irradiated on the pointing unit is reflected from the pointing unit and enters the display surface 301$s$ as the incident infrared ray R2. The incident infrared ray R2 is detected by the light-receiving element 192. The light-receiving element 192 outputs the output current corresponding to the incident infrared ray R2.

Further, of the red colored ray L1R, the green colored ray L1G, and the blue colored ray L1B radiated from the sub-pixel portions 72R, 72G, and 72B, respectively, the reflected ray which is reflected from the pointing unit enters the openings 73R, 73G, and 73B from the display surface 301$s$ as the incident visible ray L2. Each of the light-receiving elements 191R, 191G, and 191B detects the incident visible ray L2, and outputs the output current corresponding to the incident visible ray L2.

Accordingly, under the condition in which the infrared ray is not almost contained in daylight ray, i.e. in greater detail, even under the condition in which the intensity of the daylight is weak, of the visible ray L1R, L1G, and L1B, and the infrared ray R1 included in the light source rays L1, light components reflected from the pointing unit are detected by the light-receiving elements 191R, 191G, and 191B, and 192 as the incident visible ray L2 and the incident infrared ray R2. In this manner, it is possible to specify the position of the pointing unit. Further, even under the condition in which the intensity of the daylight is strong, it is possible to specify the position of the pointing unit as the light-receiving elements 191R, 191G, and 191B, and 192 detect each of the visible ray and the infrared ray included in the daylight ray as the incident visible ray L2 and the incident infrared ray R2.

In this embodiment, the backlight 206 is a fluorescent device such as a cold cathode tube which can convert an ultraviolet (UV) ray to the light source rays L1 using a fluorescent material. According to this kind of backlight 206, it is possible to easily generate the light source lays L1 including the visible ray and the infrared ray by appropriately selecting the fluorescent material.

In this embodiment, the backlight 206 may be a light-emitting device including a light-emitting element radiating the light source rays L1 according to input current. According to this kind of backlight 206, it is possible to change the intensity of the light source rays L1 according to the input current. According to this kind of backlight 206, it is possible to easily change the intensities of the visible ray and the infrared ray included in the light source rays according to the intensity of the daylight ray in order to detect the pointing unit. Particularly in the case of using an organic electroluminescent (EL) element as the light-emitting element which constitutes the backlight 206, it is possible to set the light-emitting characteristic of the backlight 206 according to selection of a light-emitting material constituting the light-emitting layer and layer-forming condition. In greater detail, wavelengths of the red colored ray L1R, the green colored ray L1G, and the blue colored ray L1B, and the infrared ray R1 included in the light source rays L1 can be minutely set. The light-emitting element constituting the backlight 206 may be a semiconductor light-emitting element such as a light-emitting diode which has an inorganic semiconductor layer as the light-emitting layer. According to this kind of semiconductor light-emitting element, it is possible to stably radiate the infrared ray R1 from the start of lighting of the backlight 206.

The visible ray filter 89 is formed on the display surface 301s side when it is viewed from the light-receiving element 192 side and is buried in the aligning film 22 so as to overlap the light-emitting element 192 in the opening 83. The visible ray filter 89 blocks the visible ray but allows the incident infrared ray R2 to penetrate therethrough so that the infrared ray R2 travels from the display surface 301s to the light-receiving element 192.

According to the visible ray filter 89, when displaying the image within the image display region 10a, it is possible to block the visible ray directing toward the display surface 301s from the TFT array substrate 10. Accordingly, while the liquid crystal device 1 operates, it is possible to prevent the opening 83 from being displayed white (so-called white void display) and to improve the display quality of an image by the liquid crystal device 1.

A polarizing layer (not shown) placed between the light-receiving elements 191R, 191G, 191B, and 192 and the liquid crystal layer 50 and the first polarizing layer 301 are arranged in a crossed Nicols configuration in which optical axes thereof intersect one another.

The light quantity adjustment portion 82 functions as a stopping mechanism for adjusting the light quantity of the incident ray L2 which enters the opening 83 from the display surface 301s. In this embodiment, as described with reference to FIG. 5, it is possible to individually adjust the light quantity of the incident ray L2 for each of the light quantity adjustment portions 82 in order to enable control of the alignment state of the liquid crystal portion of the liquid crystal element 50b. Accordingly, in the similar manner with the case of controlling the light intensity of the display ray by controlling the alignment state of the liquid crystal layer in each pixel portion, it is possible to individually adjust the intensity of the incident visible ray L2 directing toward the light-receiving element 192 of the optical sensor portion 150 for each pixel portion. Accordingly, since it is possible to weaken the intensity of the incident visible ray L2 before the incident visible ray L2 enters the visible filter 89, it is possible to reduce an amount of a visible ray component which cannot be blocked only by the visible filter 89 and thus reaches the light-receiving element 192. Accordingly, it is possible to reduce the noise generated when the visible ray is irradiated on the light-receiving element 192, and thus it is possible to improve detection precision of the pointing unit.

The liquid crystal device 1 includes a second polarizing layer 302 which is disposed at the TFT array substrate 10 side when the liquid crystal device 1 is viewed from the liquid crystal layer 50 side and extends to overlap the pixel electrode 9a. The second polarizing layer 302 has an optical axis extending in a direction in which an optical axis of the above-mentioned not-shown polarizing layer extends. Accordingly, owing to the second polarizing layer 302, it is possible to linearly polarize the light source rays L1 which enter each of the pixel portions.

The first polarizing layer 301 and the second polarizing layer 302 have a structure interposed between protective films made of a stretched polyvinyl alcohol (PVA) film composed of triacethlcelluose (TAC).

As shown in FIGS. 8 and 9, the light shielding film 153 is a so-called black matrix which defines at least part of the borders of the openings 73R, 73G, and 73B. Accordingly, owing to the light shielding film 153, it is possible to reduce radiation of the incident visible ray L2 to semiconductor elements such the pixel switching TFT 30 and the TFT circuit portions 80 from the display surface 301s side, and thus it is possible to reduce optical leakage current attributable to the semiconductor elements included in the TFT 30 and the TFT circuit portion 80.

The liquid crystal device 1 includes a light shielding film 11 formed under the light-receiving elements 191R, 191G, 191B, and 192 on the TFT array substrate 10. The light shielding film 11 is made of a material having a light shielding characteristic, such as metal film, and blocks the light source rays L1 so that the light source rays L1 radiated from the backlight 206 enter the light-receiving elements 191R, 191G, 191B, and 192. Accordingly, owing to the light shielding film 11, it is possible to reduce the noise generated attributable to radiation of the light source rays L1 to the light-receiving elements.

The light shielding film 11 extends on the TFT array substrate 10 so as to overlap the TFT circuit portion 80 and the pixel switching TFT 30. Accordingly, owing to the light shielding film 11, it is possible to block the pixel switching TFTs 30 and the TFT circuit portions 80, and thus it is possible to reduce malfunction of the TFTs 30 and the TFT circuit portions 80.

Next, detailed structure and placement of the light-receiving elements 191R, 191G, 191B, and 192 will be described with reference to FIGS. 11 and 12. Since each of the light-receiving elements 191R, 191G, 191B, and 192 has the same structure as the others, only the structure of the light-receiving element 191B will be described and the structures of the light-receiving elements 191R, 191G, and 191B will be understood by referring to description of the structure of the light-receiving element 192.

In FIG. 11, the light-receiving element 191B is formed on the TFT array substrate 10 so as to face the opening 73B in a plan view.

The light-receiving element 191B has a light-receiving layer 191a' which is an example of "first light-receiving layer" of the invention. The light-receiving element 191B is a lateral PIN diode in which a P-type conductive region 191b' and an N-type conductive region 191c', which constitute the semiconductor layer 191a which is an example of "second semiconductor layer" of the invention and are electrically connected to the light-receiving layer 191a', do not overlap a light-receiving surface of the light-receiving layer 191a'. Accordingly, owing to the structure of the light-receiving element 191B, it is possible to prevent deterioration of light-receiving sensitivity, which is likely to happen when each of the P-type conductive region 191b' and the N-type conductive region 191c' overlaps the light-receiving layer 191a'.

In FIG. 12, the light-receiving element 192 is a vertical PIN diode including a light-receiving layer 192a' which is an example of "second light-receiving layer" of the invention and a P-type conductive region 192b' and an N-type conductive region 192c' which overlap the light-receiving layer 192a' at both sides of the light-receiving layer 192a', and are electrically connected to the light-receiving layer 192a'. Accordingly, at the time of manufacturing the liquid crystal device 1, it is possible to easily form the light-receiving element 192 on the TFT array substrate 10 by forming the P-type conductive region 192b', the light-receiving layer 192a', and the N-type conductive region 192c' in this order.

In FIG. 11, an insulation film 41 is an example of "first layer" of the invention, and a semiconductor layer 1a provided in the TFT 30 is an example of "first semiconductor layer" of the invention which is formed on the insulation film 41. The light-receiving element 191B has a semiconductor layer 191a which is an example of "second semiconductor layer" of the invention which is formed on the insulation film 41. Accordingly, the semiconductor layers 1a and 191a can be formed by a common process in manufacturing process of the liquid crystal device 1. In greater detail, the semiconductor layers 1a and 191a can be simultaneously or collaterally formed by forming a semiconductor layer, such as a polysilicon layer, on the insulation film 41 and simultaneously or collaterally patterning the semiconductor layer so as to be plane patterns according to layouts of the TFT 30 and the light-receiving layer 191a. Accordingly, it is possible to simplify the manufacturing process of the liquid crystal device 1 compared to the case of additionally including the semiconductor layer 191a besides the process of forming the semiconductor layer 1a.

The semiconductor layer la provided in the TFT 30 is, for example, a low temperature polysilicon layer and includes a channel region 1a' which overlaps a gate electrode 3a1, a source region 1b', and a drain region 1c'. While the liquid crystal device 1 operates, a channel is formed at the channel region 1a' by electric field from the gate electrode 3a1 electrically connected to the scan line 3a. Of an insulation film 42a constituting a portion of the insulation film 42, a portion extending between the gate electrode 3a1 and the semiconductor layer 1a constitute a gate insulation film of the TFT 30. The source region 1b' and the drain region 1c' are in mirror symmetry to each other at both sides of the channel region 1a'.

The gate electrode 3a1 is made of a conductive film, such as a polysimicon film. Alternatively, the gate electrode 3a1 is made of a metal film, a metal alloy film, a metal silicide, a polycide film or a laminated form thereof, each containing at least one kind of metals, such as Ti, Cr, W, Ta, Mo, Pd, Al, etc. The gate electrode 3a1 is provided on the channel region 1a' with the insulation film 42a therebetween. The gate electrode 3a1 does not overlap the source region 1b' and the drain region 1c' at all.

Each of the source region 1b' and the drain region 1c' of the TFT 30 has a lightly doped drain (LDD) structure which includes a lightly doped source region and a lightly doped drain region.

Each of contact holes 181 and 182 is formed so as to penetrate through insulation films 42a and 42b constituting the insulation film 42 and to reach the semiconductor layer 1a. The contact holes 181 and 182 are electrically connected to the source region 1b' and the drain region 1c', respectively. The source electrode 91 and the drain electrode 92 are formed on the insulation film 42b and electrically connected to the contact holes 181 and 182, respectively. The source electrode 91 and the drain electrode 92 are covered with the insulation film 43a, and the drain electrode 92 is electrically connected to the pixel electrode 9a through the contact hole on the insulation film 41.

In FIG. 12, the light-receiving element 192 has a light-receiving layer 192a' formed on an insulation film 43 which is an example of "second layer" of the invention and different from the insulation film 41 and is formed after the light-receiving element 191 is formed.

The light-receiving element 192 has a transparent upper electrode 169a which overlaps the N-type conductive region 192c' formed on the light-receiving layer 192a' of the P-type conductive region 192b' and the N-type conductive region 192c' and is electrically connected to the N-type conductive region 192c' on the N-type conductive region 192c'.

The upper electrode 169a is made of a transparent conductive material such as indium tin oxide (ITO). Owing to the upper electrode 169a, in the case in which the incident infrared ray R2 enters the light-receiving element 192 from an upper layer of the light-receiving element 192, it is possible to precisely detect the light blocked by the pointing unit since the incident infrared ray R2 is not blocked by the upper electrode 169a.

The light-receiving element 192 overlaps the P-type conductive region 192b' formed under the light-receiving layer 192a' of the P-type conductive region 192b' and the N-type conductive region 192c', and is electrically connected to a conductive film 199 under the P-type conductive region 192b'. The conductive film 199 is made of a transparent conductive material such as ITO.

The light-receiving element 192 is, for example, an Indium-Gallium-Arsenic (InGaAs) PIN photodiode. With this light-receiving element, it is possible to broaden the wavelength range of the infrared ray which can be received to the extent of about 1 to 5 µm. It is possible to easily form an element on the TFT array substrate 10 by using a photoconductive element which uses lead sulfide (PbS) as the light-receiving element 192. Further, it is possible to make the light-receiving element 192 operate at room temperature by using a photoconductive element which uses lead selenium (PbSe) as the light-receiving element 192.

Figure 13:
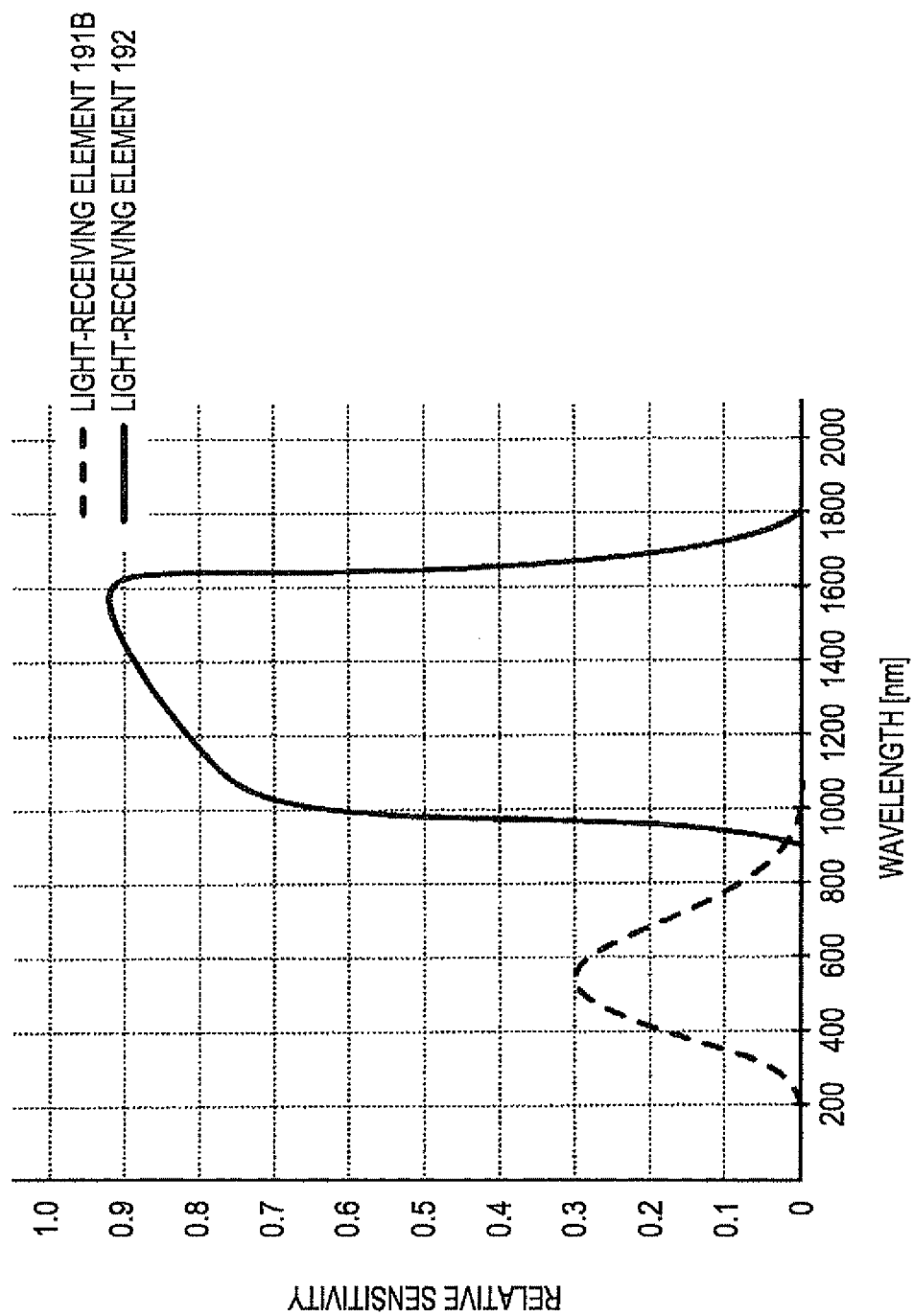
FIG. 13 is a graph illustrating relative sensitivity of a light-receiving element with respect to wavelength of light.

Next, the light-receiving sensitivity of each of the light-receiving elements 191B and 192 will be described with reference to FIG. 13. FIG. 13 shows a relative sensitivity characteristic indicated by relative sensitivity of each of the light-receiving elements 191B and 192 with respect to a wavelength of light. Here, the relative sensitivity is the standard showing the light-receiving sensitivity of each light-receiving element with respect to light to the maximum light-receiving sensitivity (reference) of each element, and an example of "light-receiving sensitivity" of the invention. Accordingly, in a single light-receiving element, it is possible to compare the relative sensitivities with respect to each of wavelengths of light to one another, but it must be noted that comparison of the relative sensitivities between different elements is physically meaningless.

In FIG. 13, the light-receiving element 191B, i.e. light-receiving element which can detect the visible ray, can detect light having a wavelength in the range from 200 to 1000 nm. The light-receiving element 192, i.e. light-receiving element which can detects the infrared ray, can detect light having a wavelength in the range from 900 to 1800 nm. Here, the relative sensitivity characteristic of each of the light-receiving elements 191B and 192 has wavelength dependence. That is, the sensitivity changes according to the wavelength of light. As shown in FIG. 13, a peak value of the relative sensitivity of the light-receiving element 191B exists when the wavelength of light is about 500 nm. A peak value of the relative sensitivity of the light-receiving element 192 exists when the wavelength of light is about 1600 nm. Moreover, the relative sensitivities of the light-receiving elements 191B and 192 do not almost overlap each other. Accordingly, the light having a wavelength in the range which cannot be detected by the light-receiving element 191B can be detected by the light-receiving element 192, and the light having a wavelength in the range which cannot be detected by the light-receiving element 192 can be detected by the light-receiving element 191B. With such a structure, although it was difficult in the past to improve detection precision of the pointing unit by the detection of either one of the visible ray and infrared ray, it becomes possible to improve detection precision of the pointing unit by detecting both the incident visible ray L2 and the incident infrared ray R2 which enter the display surface 301s by using two kinds of light-receiving elements. Further, in this embodiment, the wavelength of the incident visible ray L2 is preferably in the range from 400 to 700 nm. The incident infrared ray R2 may be a near-infrared ray having a wavelength in the range from 800 to 1000 nm.

The light-receiving elements 191R, 191G, 191B, and 192 which constitute the light-receiving element portion 191 may be different from each other from the point of view of various element design items, such as the element structure, size, and material so that wavelength bands thereof, which indicate the light-receiving sensitivity, are different from one another.

Figure 14:
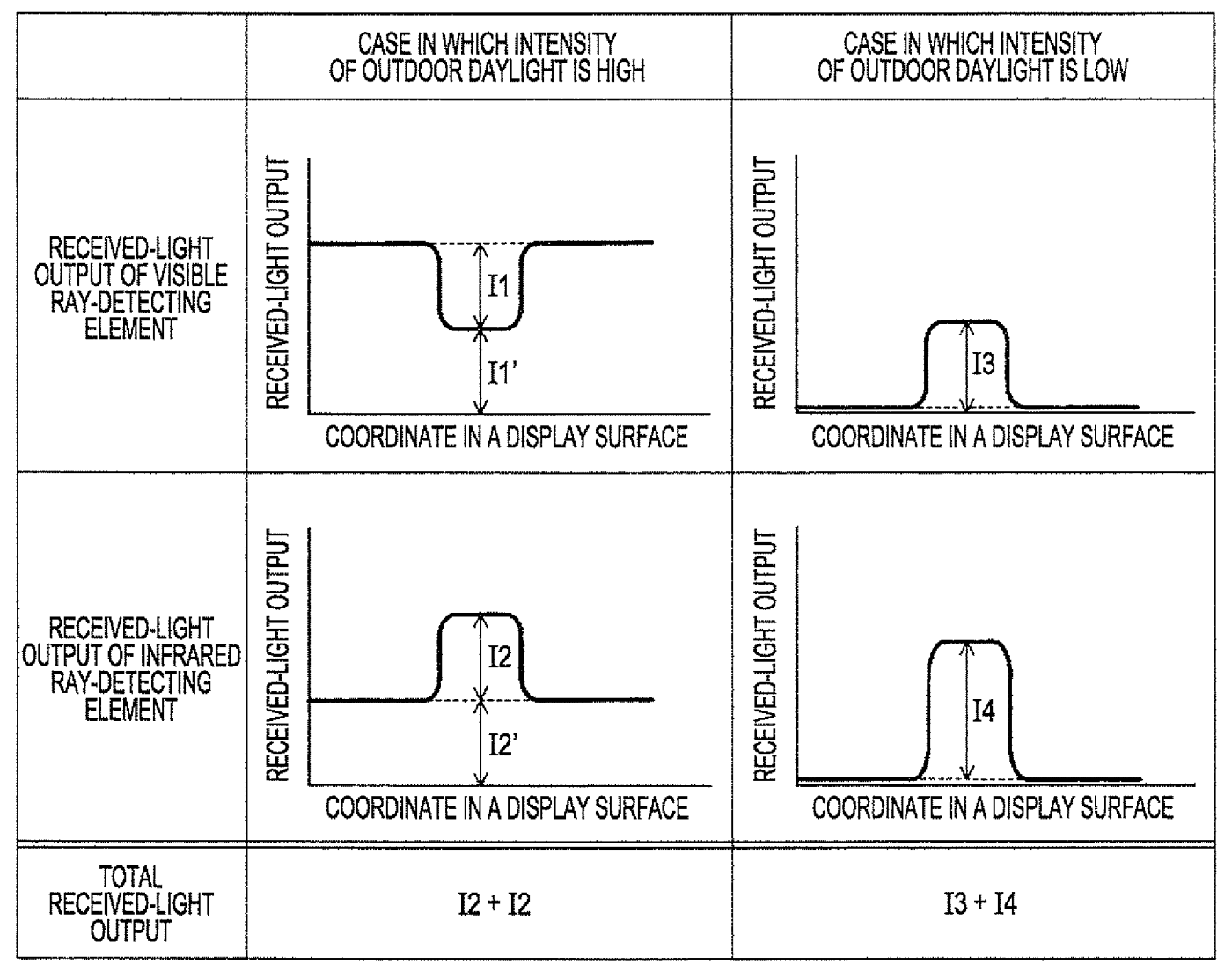

Next, with reference to FIG. 14, the output current from the light-receiving element portions 191 and 192 will be described with the cases in which the intensity of daylight ray is strong and in which the intensity of daylight ray is weak. FIG. 14 is a list showing the total received-light outputs, i.e. the total output current output from the light-receiving element portions 191 and 192 in the cases in which the intensity of the daylight ray is strong and in which the intensity of the daylight ray is weak.

As shown in FIG. 14, in the case in which the intensity of the daylight ray is strong (bright case), the output current I1' output from the light-receiving unit 191 placed at the region pointed by the pointing unit of the image display region 10a, i.e. the region of the image display region 10a, at which the pointing unit overlaps, is lower than the output current output from the light-receiving element portion 191 placed at the region at which the pointing unit does not overlap by the current I1. This is because the intensity of the incident visible ray L2 reaching the light-receiving element portion 191 is lower than that of the surroundings at the region at which the daylight ray are blocked by the pointing unit.

In the case in which the intensity of the daylight ray is strong, the output current I2+I2' output from the light-receiving element portion 192 placed at the region pointed by the pointing unit of the image display region 10a, i.e. the region of the image display region 10a at which the pointing unit overlaps has a higher value than the output current I2' output from the light-receiving element 192 placed at the region at which the pointing unit does not overlap by the current I2. This is because the intensity of the incident infrared ray R2 at the region at which the daylight ray are blocked by the pointing unit is stronger than that at the region which the pointing unit does not overlap for the reason that the infrared ray R1 radiated from the display surface 301s is reflected from the pointing unit and than reaches the light-receiving element 192 as the incident infrared ray R2.

Accordingly, the total received-light output which is processed by the received-light signal processing circuit portion 215 and the image processing circuit portion 216 for specifying the position of the pointing unit becomes the output current I1+I2. Accordingly, under the condition in which the intensity of daylight ray is strong, it is possible to precisely specify the pointing unit on the basis of the sum of the reduced amount (decreased current I1) of the output current according to the reduction of the intensity of the incident visible ray L2 in the region of the image display region 10a at which the pointing unit overlaps, and the increased output current I2 according to the intensity of the incident infrared ray R2 at the region at which the pointing unit overlaps of the image display region 10a. Accordingly, it is possible to precisely specify the pointing unit compared to the case of specifying the position of the pointing unit on the basis of only the current I1 output as the incident visible ray becomes lower than other region.

Next, in the case in which the intensity of the daylight ray is weak (dark case), output current I3 output from the light-receiving element 191 placed in the region pointed by the pointing unit of the image display region 10a, i.e. the region at which the pointing unit overlaps of the image display region 10a has a higher value than the output current output from the light-receiving element portion 191 placed in the region at which the pointing unit does not overlap by the current I3. This is because the light reflected from the pointing unit of the visible ray L1 radiated from the display surface 301s is detected by the light-receiving element portion 191 as the incident visible ray L2.

In the case in which the intensity of daylight ray is weak (dark case), output current I4 output from the light-receiving element 192 placed in the region pointed by the pointing unit of the image display region 10a, i.e. the region at which the pointing unit overlaps of the image display region 10a, has a higher value than output current output from the light-receiving element 192 placed in the region at which the pointing unit does not overlap by the output current I4. This is because the infrared ray R1 radiated from the display surface 301s is reflected from the pointing unit and reaches the light-receiving element 192 as the incident infrared ray R2 in the region at which the daylight ray are blocked by the pointing unit.

Accordingly, in the case in which the intensity of daylight ray is weak, the total received-light output processed by the received-light signal processing circuit portion 215 and the image processing circuit portion 216 for specifying the position of the pointing unit becomes the output current I3+I4. Accordingly, it is possible to increase the total received-light output and to relatively precisely specify the pointing unit compared to the case of specifying the position of the pointing unit on the basis of only the current I3 output according to the visible ray.

With such a structure of the liquid crystal device 1, like the case in which it is possible to more precisely detect the pointing unit under both of the conditions in which the daylight is strong and in which the daylight is weak, even under the case in which the intensities of the daylight ray and the display ray radiated from the display surface 301s are almost equal to each other, since both of the incident visible ray L2 and the incident infrared ray R2 are detected, it becomes possible to acquire more precise information on the position and shape of the pointing unit compared to the case of detecting the pointing unit on the basis of only the visible ray.

Accordingly, with the structure of the liquid crystal device 1 according to this embodiment, since it is possible to detect both of the incident visible ray L2 and the incident infrared ray R2 which enter the display surface 301s according to the position and shape of the pointing unit while the liquid crystal device 1 operates, it is possible to improve detection sensitivity of the pointing unit compared to the case of detecting the pointing unit using one light-receiving element whose detectable wavelength band is only one kind.

Accordingly, with the structure of the liquid crystal device 1 according to this embodiment, for example, it is possible to surely detect the pointing unit, such as a finger regardless of the intensity of daylight ray, and thus it is possible to improve the touch panel function of the liquid crystal device 1.

Second Embodiment

Figure 15:
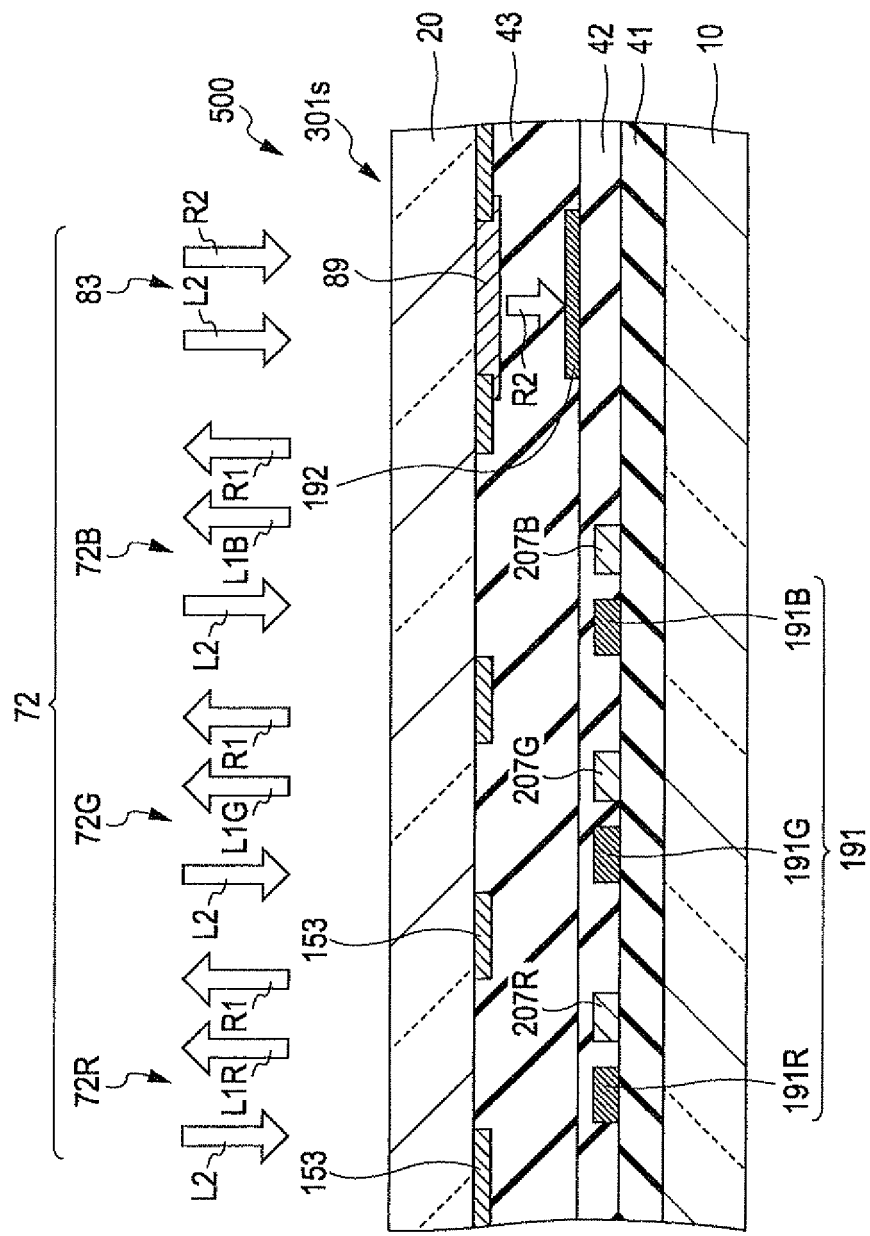
FIG. 15 is a sectional view illustrating a main portion of a light-emitting device which is an electro-optical device according to a second embodiment.

A light-emitting device 500 which is another embodiment of the electro-optical device of the invention will be described with reference to FIG. 15. FIG. 15 is a sectional view illustrating the structure of main part of the light-emitting device 500 according to this embodiment. Like elements with the liquid crystal device 1 will be referenced by like numbers and repetitive description of like elements will be omitted.

In FIG. 15, the light-emitting device 500 has a pixel portion 72 composed of a plurality of sub-pixel portions 72R, 72G, and 72B which can radiate different colored rays, for example, a red colored ray L1R, a green colored ray L1G, and a blue colored ray L1B.

The plurality of sub-pixel portions 72R, 72G, and 72B is provided with light-emitting elements 207R which radiate the red colored ray L1R, light-emitting elements 207G which radiate the green colored ray L1G, and light-emitting elements 207B which radiate the blue colored ray L1B, respectively. The light-emitting device 500 can perform a color image display on the display surfaced 301s by three kinds of colored rays.

The plurality of sub-pixel portions 72R, 72G, and 723 are provided with light-receiving elements 191R, 191G, and 191B, respectively which can detect the incident visible ray L2. Accordingly, the light-emitting device 500 can detect the incident visible ray L2 while the light-emitting device 500 operates like the liquid crystal device 1.

Each of the plurality of light-emitting elements 207R, 207G, and 207B is an organic EL element or a semiconductor light-emitting diode, and can radiate the infrared ray R1 toward the display surface 301s side as the display ray along with the colored rays that are supposed to be radiated by respective light-emitting elements.

Accordingly, the light-emitting device 500 may not additionally employ an element radiating the infrared ray to detect the pointing unit such as a finger which points the display surface 301s other than the light-emitting elements 207R, 207G, and 207B, and thus it is possible to simplify the device structure. If at least one element of the light-receiving elements 191R, 191G, and 191B is structured to be able to radiate the infrared ray, it is possible to simplify the structure of the light-emitting device 500.

The light-emitting device 500 has the light-receiving elements 191R, 191G, and 191B which can detect the incident visible ray L2 and the light-receiving element 192 which can detect the incident infrared ray R2 like the liquid crystal device 1. Accordingly, like the liquid crystal device 1, it becomes possible to more precisely specify information such as position of the pointing unit on the basis of the total received-light output which is output as both of the incident visible ray L2 and the incident infrared ray R2 are detected by the light-receiving elements. The light-emitting device 500 is provided with visible ray filters 89 in a manner of overlapping the openings 83 in which the light-receiving elements 192 are placed in the TFT array substrate 10, and the incident visible ray L2 radiated toward the light-receiving elements 192 can be reduced. Accordingly, it is possible to reduce the noise generated in the light-receiving elements 192 attributable to irradiation of the incident visible ray L2, and thus it is possible to improve the detection precision of the pointing unit.

Electronic Apparatus

Next, embodiments of an electronic apparatus equipped with the above-described liquid crystal device will be described with reference to FIGS. 16 and 17.

Figure 16:
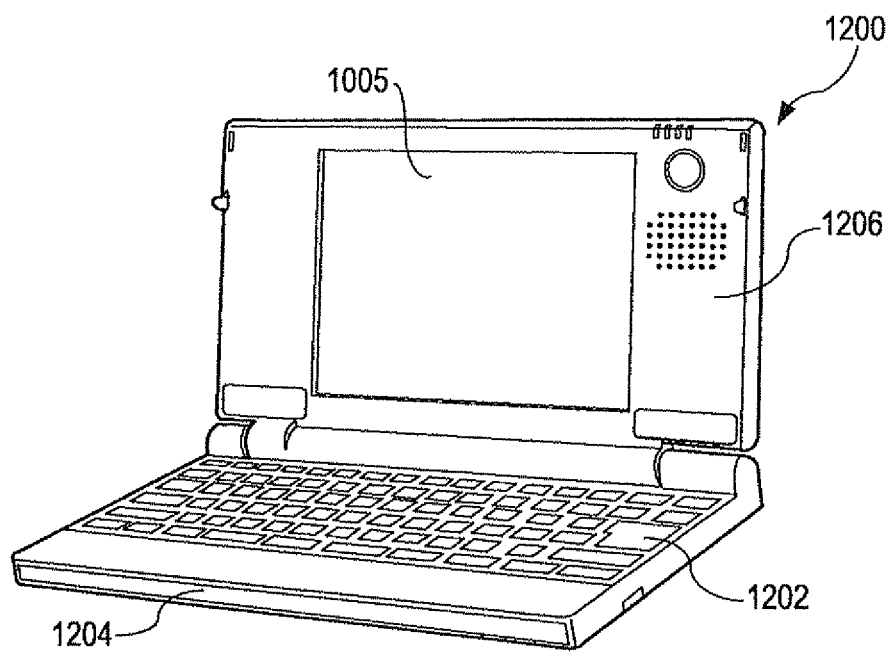
FIG. 16 is a perspective view illustrating an example of an electronic apparatus according to one embodiment.
Figure 17:
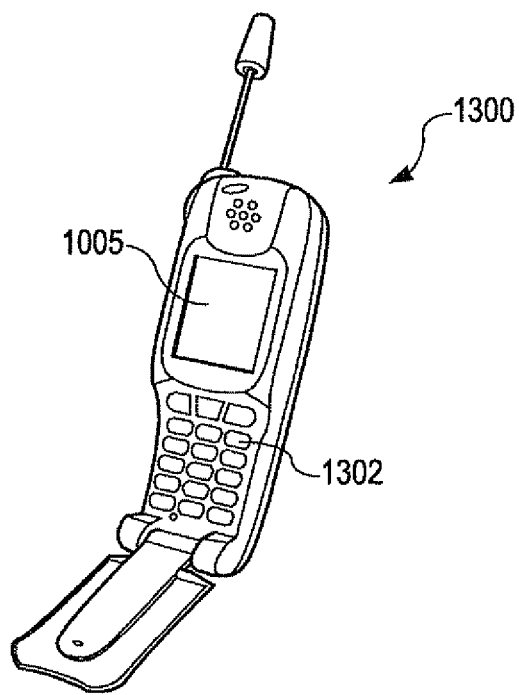
FIG. 17 is a perspective view illustrating another example of an electronic apparatus according to another embodiment.

FIG. 16 is a perspective view illustrating a mobile personal computer (PC) to which the above-mentioned electro-optical device is applied. In FIG. 16, the computer 1200 includes a main body portion 1204 provided with a keyboard 1202 and a display unit 1206 having the above-described liquid crystal device. The display unit 1206 has a structure including a backlight provided to the back surface of the display panel 1005 and a touch panel function through which it is possible to precisely input various kinds of information.

Next, an example, in which the above-described light crystal device is applied to a cellular phone, will be described. FIG. 17 is a perspective view illustrating a cellular phone which is an example of an electronic apparatus according to one embodiment of the invention. In FIG. 17, the cellular phone 1300 has a plurality of touch-type operation buttons 1302, employs a transmissive display system, and includes a liquid crystal device 1005 which has the similar structure as the above-described liquid crystal device. With this cellular phone 1300, it is possible to perform a high-definition image display and to precisely input information via the display surface by a pointing unit such as a finger. Further, besides the liquid crystal device, the light-emitting device can be obviously applied to various kinds of electronic apparatuses, and it is also possible to improve the touch panel function of the electronic apparatus like the case of using the liquid crystal device.

What is claimed is:
1. An electro-optical device comprising:
a plurality of pixel portions formed in a display region on a substrate; and
a plurality of photodetecting circuits corresponding to the pixel portions, each photodetecting circuit including
an optical sensor portion including
a first light-receiving element which is formed in the display region and shows light-receiving sensitivity with respect to an incident visible ray which enters a display surface,
a second light-receiving element which is formed in the display region and shows light-receiving sensitivity with respect to an incident infrared ray which enters the display surface, and
a detecting unit which detects a pointing unit which points the display surface on the basis of a sum of the light-receiving sensitivity with respect to the incident visible ray and the light-receiving sensitivity with respect to the incident infrared ray, and
a light quantity adjustment portion configured to adjust, for each respective pixel portion, the amount of incident visible rays which enter the display surface and are received by the respective first light-receiving element, and
wherein the first and second light-receiving elements are electrically connected in parallel to each other such that a cathode terminal of the first light-receiving element is directly connected to a cathode terminal of the second light-receiving element, and an anode terminal of the first light-receiving element is directly connected to an anode terminal of the second light-receiving element.

2. The electro-optical device according to claim 1, wherein the pixel portion has a pixel switching element which includes a first semiconductor layer formed in a first layer on the substrate, wherein the first light-receiving element has a first light-receiving layer which constitutes a portion of a second semiconductor layer formed in the first layer, wherein the second light-receiving element has a second light-receiving layer formed in a second layer which is different from the first layer, and wherein the first semiconductor layer and the second semiconductor layer are formed through a common process.

3. The electro-optical device according to claim 1, further comprising a visible ray filter which is formed at a display surface side when the electro-optical device is viewed from the second light-receiving element, overlaps the second light-receiving element, blocks the visible ray which travels from a substrate toward the display surface, and allows the incident infrared ray to pass therethrough.

4. The electro-optical device according to claim 1, further comprising a light source unit which is placed on the opposite side of the display surface when the electro-optical device is viewed from a substrate and radiates light source rays including a plurality of different colored rays and an infrared ray toward the display region, wherein the pixel portion has a plurality of sub-pixel portions having a plurality of color filters, respectively, which can allow the plurality of colored rays to pass therethrough, wherein the plurality of sub-pixels portions has light modulation elements, respectively, which modulate the plurality of colored rays, and wherein at least one color filter of the plurality of color filters allows the infrared ray to pass therethrough.

5. The electro-optical device according to claim 4, wherein the light source unit is a fluorescence device which converts an ultraviolet (UV) ray to the light source ray using a fluorescent material.

6. The electro-optical device according to claim 4, wherein the light source unit is a light-emitting device including a light-emitting element which radiates the light source rays according to input current.

7. The electro-optical device according to claim 6, wherein the light-emitting element is an organic electroluminescent (EL) element.

8. The electro-optical device according to claim 6, wherein the light-emitting element is a semiconductor light-emitting element.

9. The electro-optical device according to claim 1, wherein the pixel portion includes a plurality of sub-pixel portions which radiates a plurality of different colored rays, respectively and wherein at least one sub-pixel portion of the plurality of sub-pixel portions has a light-emitting element which radiates an infrared ray toward the display surface along with one of the plurality of colored rays.

10. An electronic apparatus comprising the electro-optical device according to claim 1.

11. The electro-optical device according to claim 1, wherein the parallel connection of first and second light-receiving elements is connected between first and second power source lines.

12. The electro-optical device according to claim 11, wherein a storage capacitor is connected between the first power source line and the parallel connection of first and second light-receiving elements.

13. The electro-optical device according to claim 1, wherein a sum of output currents from the first and second light-receiving elements is converted to a voltage that is read out to a read signal line.

14. The electro-optical device according to claim 13, wherein the voltage is read out to the read signal line according to an operation of a reset TFT, a voltage amplifying TFT, and an output control TFT.

15. The electro-optical device according to claim 1, wherein the light quantity adjustment portion includes a liquid crystal element, an adjustment control TFT, and a storage capacitor.

* * * * *